US008706620B2

(12) United States Patent
Ciurea

(10) Patent No.: US 8,706,620 B2
(45) Date of Patent: Apr. 22, 2014

(54) RESTRICTED USE CURRENCY

(75) Inventor: Peter Ciurea, Orinda, CA (US)

(73) Assignee: Visa International Service Association, San Francisco, CA (US)

( * ) Notice: Subject to any disclaimer, the term of this patent is extended or adjusted under 35 U.S.C. 154(b) by 42 days.

(21) Appl. No.: 13/083,231

(22) Filed: Apr. 8, 2011

(65) Prior Publication Data

US 2011/0251950 A1 Oct. 13, 2011

Related U.S. Application Data

(60) Provisional application No. 61/323,169, filed on Apr. 12, 2010.

(51) Int. Cl.
G06Q 40/00 (2012.01)
(52) U.S. Cl.
USPC .......................................................... 705/39
(58) Field of Classification Search
USPC .......................................................... 705/39
See application file for complete search history.

(56) References Cited

U.S. PATENT DOCUMENTS

| | | | |
|---|---|---|---|
| 6,021,943 | A | 2/2000 | Chastain |
| 7,014,109 | B2 | 3/2006 | Hjelmvik |
| 7,249,092 | B2 | 7/2007 | Dunn et al. |
| 7,398,248 | B2 | 7/2008 | Phillips et al. |
| 7,686,218 | B2 | 3/2010 | Hessburg et al. |
| 2002/0174031 | A1 | 11/2002 | Weiss |
| 2003/0172040 | A1 | 9/2003 | Kemper et al. |
| 2004/0039694 | A1* | 2/2004 | Dunn et al. ............ 705/39 |
| 2006/0206506 | A1 | 9/2006 | Fitzpatrick |
| 2007/0267479 | A1* | 11/2007 | Nix et al. ............ 235/379 |
| 2008/0133409 | A1 | 6/2008 | Eastley et al. |
| 2009/0271315 | A1 | 10/2009 | Hammad |
| 2010/0030688 | A1* | 2/2010 | Patterson ............ 705/44 |
| 2011/0055013 | A1 | 3/2011 | Hammad |
| 2011/0238473 | A1 | 9/2011 | Sankolli et al. |

FOREIGN PATENT DOCUMENTS

WO 2009/134790 11/2009

OTHER PUBLICATIONS

Monetary functions of commercial banks : Brennan, Joseph. Journal of the Statistical and Social Inquiry Society of Ireland (1942-1947): 62.*
Evening Meeting: Savings Bank Life Insurance: Taylor, Paul. Journal of Risk and Insurance (pre-1986) 7.1 (Mar. 1940): 61.*
The economic and social organisation of National Socialist Germany: Lloyd-Dodd, Ft. Journal of the Statistical and Social Inquiry Society of Ireland (1937-1942): 55.*
U.S. Appl. No. 61/323,169 filed Apr. 12, 2010.
The International Search Report in PCT/US2011/032027 application.

* cited by examiner

Primary Examiner — Hani M Kazim
Assistant Examiner — Hatem M Ali
(74) Attorney, Agent, or Firm — Kilpatrick Townsend & Stockton LLP

(57) ABSTRACT

A first method comprises receiving at a computer apparatus an authorization request message comprising a first merchant identifier. The request message may also comprise an account identifier associated with an account and a first transaction amount for a first transaction conducted with a first merchant. The first method further comprises determining, by the computer apparatus, if an account comprises merchant specific currency associated with the first merchant that may be used to conduct the first transaction. It may then be determined if there is sufficient merchant specific currency associated with the first merchant in the account to pay for the first transaction amount. If there is insufficient merchant specific currency associated with the first merchant to pay for the first transaction amount, then non-specific currency in the account is applied automatically to a remainder of the first transaction amount.

25 Claims, 13 Drawing Sheets

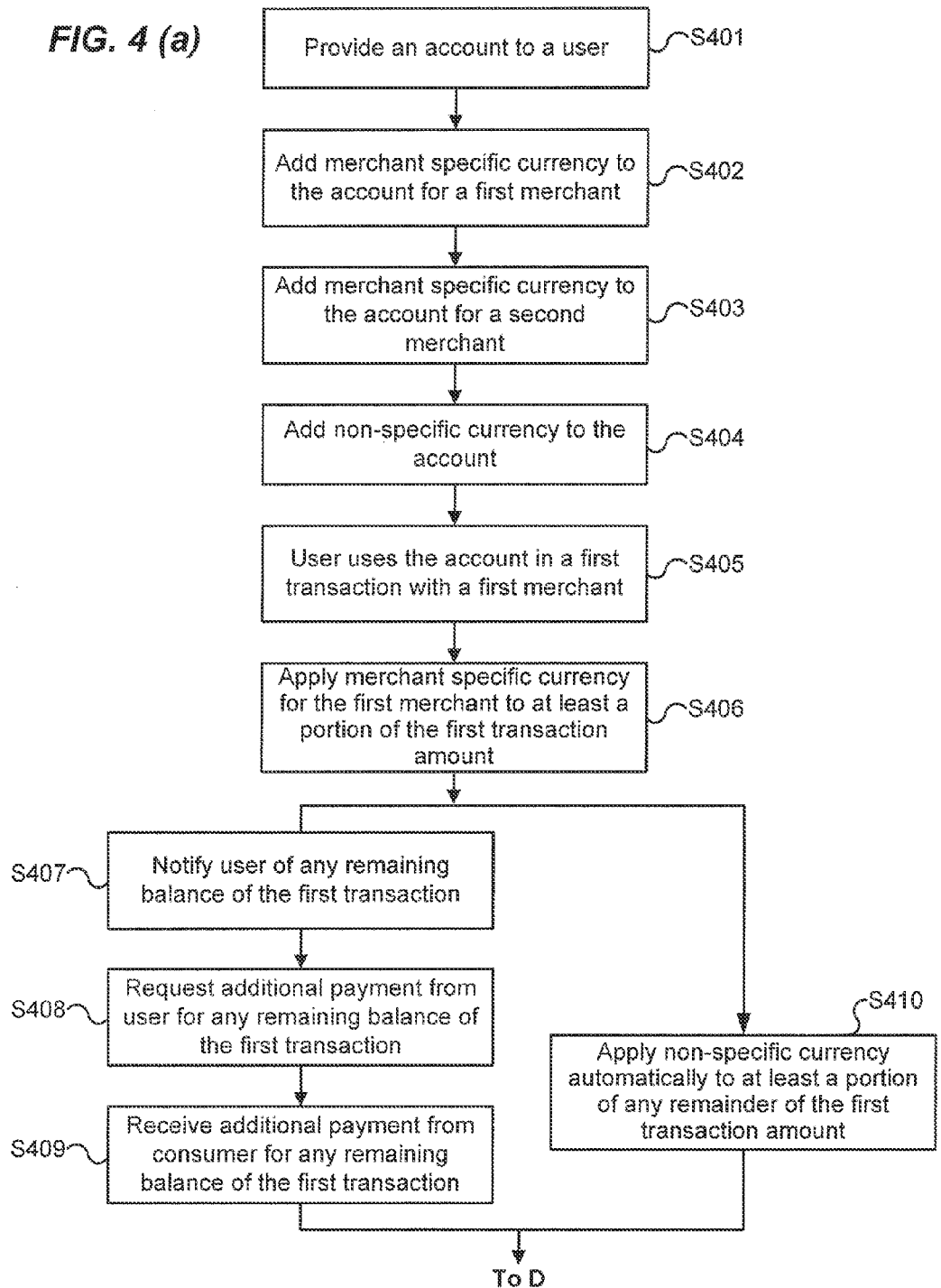

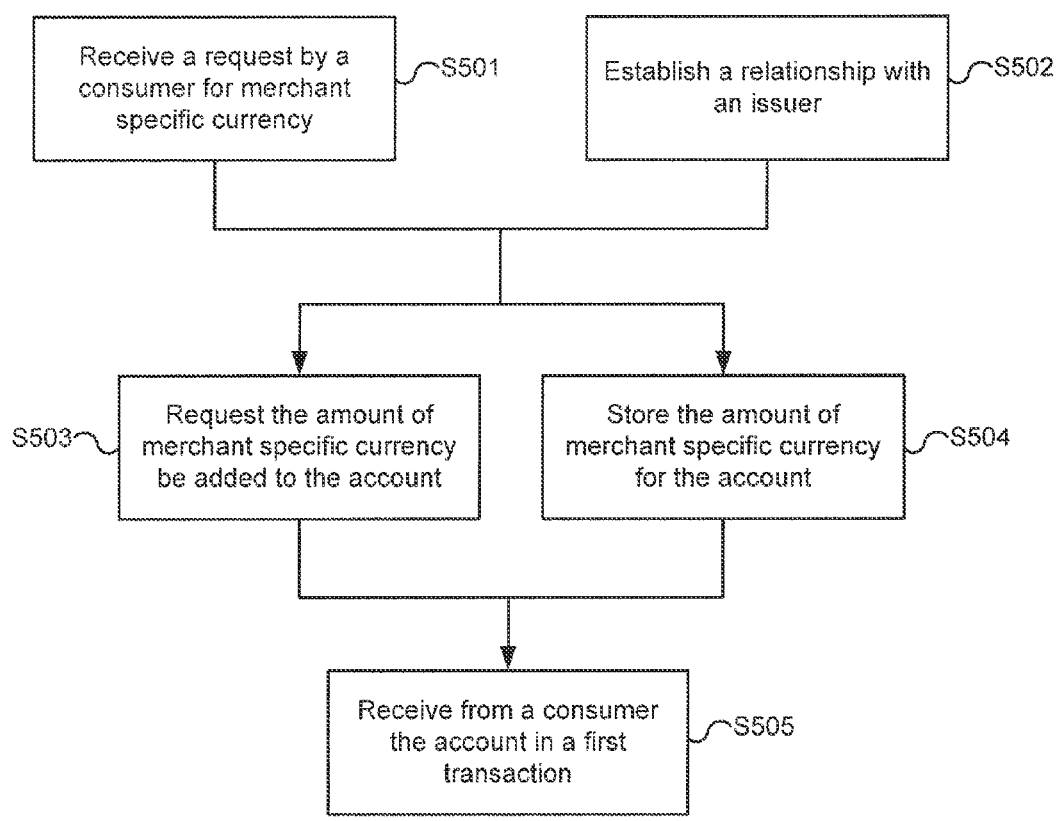

601 — https://MerchantSpecificCurrency.VISA.com

Account Number: 0123456 — 602

| 603 Participating Merchants | 605 Current Balance | 606 Amount to Add | 607 Total Available |
|---|---|---|---|
| Merchant 1 | $0.00 | $10.00 — 608 | $10.00 — 611 |
| Merchant 2 | $5.00 — 609 | $10.00 — 610 | $15.00 — 612 |
| 604 — Merchant 3 | $0.00 | $0.00 | $0.00 |
| Merchant 4 | $0.00 | $0.00 | $0.00 |
| Merchant 5 | $0.00 | $0.00 | $0.00 |

613 — Non-Specific Currency

| Current Balance | Amount to Add | Total Available |
|---|---|---|
| $100.00 — 614 | $10.00 — 615 | $110.00 — 616 |

617 — Automatically Apply Non-Specific Currency for Remaining Balances?   ● YES — 618
   ○ NO

|  | Merchant Specific Currency | | Non-specific Currency | | Total Due |
|---|---|---|---|---|---|
| Total: | $20.00 | + | $10.00 | = | $30.00 — 619 |

619

620      621

Payment Method:   ● Credit Card       Please Enter Information

○ Paypal Account      [ Name on Account ]

○ Bank Account        [ Billing Address ]

○ Order Number/      [ Card or Account Number ]
   Promotional Code  [ Expiration Date ]

FIG. 6(b)

630
631 https://MerchantSpecificCurrency.VISA.com/Account_Home

Account Number: 0123456

632 Account Information

633 Participating Merchants | Current Balance | 634
--- | --- | ---
Merchant 1 | $20.00 | ADD FUNDS >
Merchant 2 | $5.00 | ADD FUNDS >
Merchant 3 | $100.00 | ADD FUNDS >
Merchant 4 | $7.23 | ADD FUNDS >
Merchant 5 | $0.00 | ADD FUNDS >

Non-Specific Currency

635 Would you like to link a payment account?
● YES
○ NO

636 Automatically Use Payment Account for Remaining Balances?
● YES
○ NO

Payment Account to Link:
637
● Credit Card
○ Paypal Account
○ Bank Account
○ Prepaid VISA Account Please Enter Information
- Name on Account
- Billing Address
- Card or Account Number
- Expiration Date 638 Would you like to set a limit on available funds from payment account?
● YES
○ NO 639 Amount: $100.00

RESTRICTED USE CURRENCY

CROSS-REFERENCES TO RELATED APPLICATIONS

This application claims benefit under 35 U.S.C. §119(e) of U.S. provisional patent application No. 61/323,169, filed on Apr. 12, 2010, the entire disclosure of which is incorporated herein by reference for all purposes.

BACKGROUND OF THE INVENTION

Current systems for implementing restricted use currency typically involve the issuance of a gift or promotional card by a merchant for a specific amount of currency that may only be used at the merchant. If a transaction is conducted with the merchant that exceeds the amount on the gift card, then the user must present a second form of payment, such as a credit card. This is inconvenient, as it essentially comprises conducting two separate transactions. Moreover, consumer behavior often results in gift cards that have small balances remaining that may never be used because, inter alia, it becomes more of an inconvenience to continue to carry around and/or keep track of the payment device than the remaining balance is worth. Moreover, individuals may be concerned about presenting a gift card or other payment device that comprises the restricted use currency that may be used only at the merchant because the amount remaining may be insufficient to pay the transaction amount and the transaction may be thereby be declined.

Moreover, current systems for implementing restricted use currency often limit such payment devices or accounts to a single merchant. That is, if a user desires to have restricted use currency associated with multiple and different merchants, they are required to have a restricted use currency account or payment device with each merchant. This may require carrying multiple payment devices, which again is inconvenient.

Embodiments of the invention address these and other problems, individually and collectively.

BRIEF SUMMARY

Embodiments of the present invention disclosed herein are directed to systems, apparatuses, and/or methods for providing, implementing, and/or utilizing restricted use currency (i.e. merchant specific currency). The merchant specific currency and accompanying systems and methods can be implemented using one or more computer apparatus and/or database.

In some embodiments, a first method comprises receiving at a computer apparatus an authorization request message comprising a first merchant identifier. The request message may also comprise an account identifier associated with an account and a first transaction amount for a first transaction conducted with a first merchant. The first method further comprises determining, by the computer apparatus, if the account comprises merchant specific currency associated with the first merchant that may be used to conduct the first transaction. The first method further comprises determining if there is sufficient merchant specific currency associated with the first merchant in the account to pay for the first transaction amount. If there is insufficient merchant specific currency associated with the first merchant to pay for the first transaction amount, then non-specific currency in the account is applied automatically to a remainder of the first transaction amount. In some embodiments, the first method may further comprise automatically applying merchant specific currency associated with the first merchant to pay for at least a portion of the first transaction amount.

In some embodiments, in the first method described above, the step of automatically applying non-specific currency may comprise sending an authorization request message to an issuer of the account for the remainder of the first transaction amount. In some embodiments, the non-specific currency in the account comprises a payment account, such as a credit card account; a debit account; a bank account; and/or a prepaid account. In some embodiments, where there is insufficient merchant specific currency associated with the first merchant to pay for the first transaction amount, the first method further comprises determining if there is sufficient non-specific currency in the account to pay for the remainder of the first transaction amount. In some embodiments, if there is insufficient non-specific currency in the account to pay for the remainder of the first transaction, then an authorization response message is sent to the first merchant denying the first transaction. In some embodiments, if there is insufficient non-specific currency in the account to pay for the remainder of the first transaction, the merchant specific currency is applied to a portion of the first transaction amount, and a response message is sent to the merchant indicating any remainder for the first transaction.

In some embodiments, the first method described above may further comprise receiving a first request at the computer apparatus to add a first amount of merchant specific currency associated with the first merchant to the account, and then adding the first amount of merchant specific currency to the account. In some embodiments, the first request may originate from any one of: the first merchant; an issuer of the account; and/or a user that is not involved in the first transaction. In some embodiments, the method further comprises receiving a request at the computer apparatus to add a first amount of non-specific currency to the account, and then adding the first amount of non-specific currency to the account. The request to add non-specific currency may originate from any one of the first merchant; an issuer of the account; and a user that is not associated with the first transaction.

In some embodiments, a computer apparatus comprises a processor and a computer-readable medium coupled to the processor. The computer readable medium comprises code executable by the processor for implementing a method. The method comprises receiving, at the computer apparatus, an authorization request message comprising a first merchant identifier, an account identifier associated with an account, and a first transaction amount for a first transaction conducted with a first merchant. The method further comprises determining, at the computer apparatus, if the account comprises merchant specific currency associated with the first merchant that may be used to conduct the first transaction. The method further comprises determining if there is sufficient merchant specific currency associated with the first merchant in the account to pay for the first transaction amount. If there is not sufficient merchant specific currency associated with the first merchant to pay for the first transaction amount, then non-specific currency in the account is automatically applied to a remainder of the first transaction amount.

In some embodiments, a computer readable medium comprises code executable by a processor for implementing a method. The method comprises receiving at a computer apparatus an authorization request message comprising a first merchant identifier, an account identifier associated with an account, and a first transaction amount for a first transaction conducted with a first merchant. The method further comprises determining if the account comprises merchant specific currency associated with the first merchant that may be used to conduct the first transaction. The method further comprises determining if there is sufficient merchant specific currency associated with the first merchant in the account to pay for the first transaction amount. If there is not sufficient merchant specific currency associated with the first merchant to pay for the first transaction amount, then non-specific currency in the account is automatically applied to a remainder of the first transaction amount.

Embodiments of the invention may allow for the use of restricted use currency (i.e. merchant specific currency) and/or non-specific currency in a single transaction. In some embodiments, an account may have associated with it an amount of currency that is designated for use with a first merchant; that is, currency that may not be used for transactions that do not involve the first merchant (i.e. merchant specific currency). The account may also have associated with it non-specific currency; that is, currency that may be used in transactions with any merchant. When conducting a transaction, a system or method may determine if the account has merchant specific currency for the merchant involved in the transaction and, if so, whether the amount of merchant specific currency is sufficient to pay for the total amount of the transaction. If the amount of merchant specific currency is insufficient, then the merchant specific currency may still be applied to a portion of the amount of the first transaction, and the non-specific currency may be automatically applied to any remainder of the first transaction amount. In this way, embodiments herein may provide systems and methods to automatically complete a transaction when currency designated for use with a particular merchant is utilized, but is insufficient to pay for an entire transaction amount by automatically applying non-specific currency for a remainder of the transaction amount without requiring a user to present multiple payment devices.

Moreover, embodiments may also provide the ability to utilize a single restricted use currency account with merchant specific currency associated with more than one merchant. In addition, by utilizing a restricted use currency account and providing access to the account through a web-based interface, some embodiments may provide the ability for a consumer (e.g. the user involved in the transaction and/or another consumer) to purchase or obtain additional merchant specific currency for the account (which may, for instance, allow the user to readily create customized gift cards, reload currency onto an existing gift card, etc.). Embodiments may also provide the ability for a user or other participant in the system (e.g. an issuer) to link a preexisting payment account (e.g. a credit card account) to the restricted use currency account, thereby facilitating the automatic payment of any remaining amount for a transaction. This may be the case in some embodiments where the merchant specific currency was included as part of a promotion for opening a new payment account, however, it may be utilized in other embodiments as well.

BRIEF DESCRIPTION OF THE DRAWINGS

FIG. 5 shows a flowchart illustrating steps that may be involved in an exemplary registration process in some embodiments of the invention.

FIG. 6 shows an exemplary interface for some embodiments of the invention.

DETAILED DESCRIPTION

Figure 1:
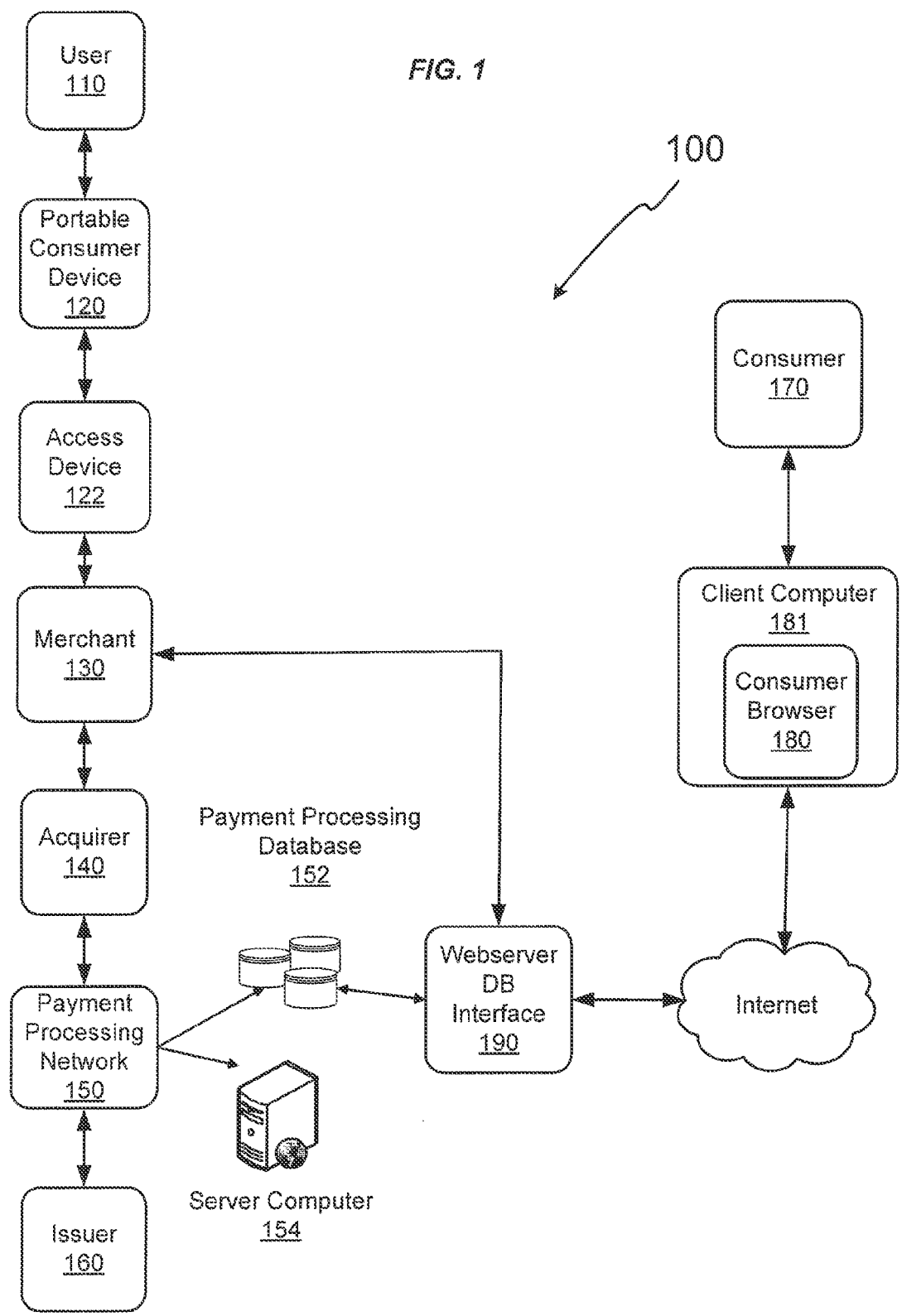
FIG. 1 shows a diagram illustrating an exemplary system that may be used in accordance with some embodiments of the invention.

Embodiments of the present invention provide systems and methods for utilizing and/or providing restricted use currency (i.e. merchant specific currency). The systems and methods provided herein may provide for the automatic completion of transactions involving merchant specific currency that is insufficient to pay for a transaction amount by automatically applying non-specific currency to a remainder of the transaction amount. Embodiments may therefore promote the use of merchant specific currency by making it more convenient for the user to conduct transactions. Embodiments may also provide for restricted use currency accounts to have merchant specific currency associated with multiple merchants. Embodiments may also provide for increase effectiveness in promotion campaigns involving the issuance of payment accounts comprising merchant specific currency.

Some terms may be described in further detail.

As used herein, "merchant specific currency" can include currency that is designated for use at a particular merchant, or at a select group of merchants. Merchant specific currency that has been designated for use with a particular merchant may be referred to as being "associated" with that merchant. Merchant specific currency may not be generally used for transactions with other merchants (or other payment recipients) that are not associated with the merchant specific currency. The currency may have a specific value, such as, for example, $10. The merchant specific currency may be "applied" to a transaction amount, meaning that it may be used as payment for the transaction amount, or a portion thereof. In some embodiments, the merchant specific currency may be used to pay for a portion of the transaction amount, and non-specific currency may be used for any remainder of the first transaction amount. Merchant specific currency may be associated with a restricted use currency account.

As used herein, "non-specific currency" can include currency that may generally be used in transactions without restrictions based on the merchant involved in the transaction. Non-specific currency may comprise any form of payment, including a payment account. Non-specific currency may also be associated with a restricted use currency account; that is, the non-specific currency may be associated with a restricted use currency account in the same manner as merchant specific currency—the non-specific currency is simply not designated for use with a particular merchant or select merchants. In some embodiments, non-specific currency may be automatically applied to a remainder of the first transaction amount to complete a transaction.

As used herein, a "restricted use currency account," can refer to an account that may have a unique identifier, such as an account number, and that may be used to complete a transaction with a merchant. A restricted use currency account may be associated with both merchant specific currency and/or non-specific currency. A restricted use currency account may also be associated with (i.e. linked to) a payment account, such as a credit card account, debit card account, bank account, Paypal® account, a pre-paid VISA card, etc. In some embodiments, the restricted use currency account is a payment account, and the merchant specific use currency may be associated with the payment account. That is, in some embodiments (such as embodiments where the merchant specific currency is provided as a promotion for opening a new account with an issuer and/or embodiments where the merchant specific currency was provided as part of a promotion by, or transaction with, a merchant) the merchant specific currency is directly associated with the payment account. In such embodiments, the user may need only present the payment account (such as by presenting a credit card at a POS terminal) to effectuate the use of merchant specific currency (and/or non-specific currency) to provide payment for a transaction.

As used herein, an "authorization request message" is a message that may be generated that contains information about a transaction. For instance, in some embodiments the authorization request message may contain information such as an identifier of a merchant involved in the transaction, an identifier of an account (such as a restricted use currency account and/or payment account) presented by a consumer as payment of the transaction, the transaction amount, and/or any other relevant information. The authorization request message may also comprise a request for a response as to whether the payment is approved. Typically, the authorization request message is generated at or by an access device 122 (such as POS terminal).

In some embodiments, an "authorization request message" may be a message that includes an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards. Other data elements that may be in an authorization request message may include an expiration date, a verification value (CVV value), a service code, a merchant ID, a transaction amount, etc.

As used herein, "applying" currency (e.g. merchant specific currency or non-specific currency) refers to using, designating for use, or otherwise authorizing completion of a transaction utilizing a particular currency (e.g. type of currency) as payment. In some embodiments, a general account comprises all currency associated with a restricted use currency account; that is, the merchant specific currency and non-specific currency may be in the same general account (e.g. at an issuer), with no separation or designation. A database or other computer apparatus may comprise a table or other data structure that designates (or maintains a balance of) types of currency associated with an account. Each of the types of currency may be "applied" by, for instance, authorizing the transaction and reducing the maintained balances in the database for any of the currency types used in the transaction. In some embodiments, currency may be applied by sending an authorization request message to an issuer of an account and/or receiving an authorization response message approving the transaction.

A "payment device" can refer to any device, such as a portable consumer device, that may be used to pay for the cost of a transaction. Typically payment device is associated with a payment account, such as a bank account or credit card account.

With reference to the components illustrated in FIG. 1, some embodiments of a restricted use currency system and methods thereof may comprise the following:

An issuer 160 issues user 110 an account that may comprise merchant specific currency. Issuer 160 may also issue a portable consumer device 120 that is associated with the account. Payment processing network 150 comprises a payment processing database 152 that comprises information related to the restricted use currency account, including any merchant specific currency balances and/or non-specific currency balances associated with the account. The restricted use currency account may comprise merchant specific currency based on a request by merchant 130, consumer 170, and/or issuer 160 that the account be provided with a specific amount of merchant specific currency associated with a particular merchant 130. If the restricted use currency account already has a balance of merchant specific currency for the particular merchant, the requested amount is added to that balance.

In some embodiments, in a payment transaction involving a restricted use currency account, user 110 purchases goods or services using payment device (such as a portable consumer device 120). The user 110 can use the portable consumer device 120 and may interact with an access device 122 (e.g., a POS terminal) by passing the portable consumer device 120 by a reader in the access device. The access device may then generate an authorization request message which is then sent to the issuer 160 via the acquirer 140 and the payment processing network 150. The authorization request message may contain information such as the transaction amount, a merchant category code, a specific merchant identifier, a PAN (primary account number associated with the portable consumer device 120), an expiration date associated with the portable consumer device 120, a card verification value, a restricted use currency account identifier, and/or other suitable information.

When payment processing network 150 receives the authorization request message, the server computer 154 determines if the account associated with the portable consumer device 120 comprises merchant specific currency associated with the merchant 130 involved in the transaction. If the account comprises merchant specific currency for the merchant involved in the transaction, the merchant specific currency is applied to the transaction amount.

In some embodiments, if the restricted use currency account has merchant specific currency associated with the merchant 130 involved in the transaction, the server computer 154 in the payment processing network 150 can determine if there is sufficient merchant specific currency to pay for the transaction amount. For example, a database 152 that is accessible to the server computer 154 may include a table indicating that the restricted use currency account can have $50 available for purchase at Merchant A and $100 available for purchase at Merchant B. If the merchant 130 is Merchant A, and if the purchase amount is $75, then the server computer 154 may act on behalf of the issuer and may deny the transaction by sending an authorization response message to the merchant 130 indicating that the transaction is denied. If the purchase transaction amount is $25, then the server computer 154 could approve of the transaction on behalf of the issuer 160 and could send an authorization response message back to the merchant 130 indicating that the transaction is approved.

In some embodiments, the restricted use currency account may also have non-specific currency associated with the account. The non-specific currency may be automatically applied to complete a transaction when the amount of merchant specific currency is insufficient. For instance, in the example described above, the restricted use currency account may have $100 of non-specific currency available. Again, assuming that Merchant A has $50 available, and if the purchase is for $75, the server computer may apply the $50 available for Merchant A to the transaction amount, and then automatically apply $25 from the non-specific currency available to pay the remainder of the transaction amount. In this way, embodiments may provide systems and methods for automatically completing a transaction when an amount of merchant specific currency is insufficient.

In some embodiments, the non-specific currency associated with the restricted use currency account may comprise a payment account; that is, the non-specific currency is associated with a payment account such that the payment account may be used to complete a transaction for which there is insufficient merchant specific currency available. In some embodiments, if the merchant specific currency is insufficient to pay for a transaction amount, an authorization request message is automatically sent by the server computer 154 to the issuer 160 requesting the remainder of the transaction amount (e.g. the amount after the merchant specific currency is applied). The issuer may approve of a transaction based on the amount of available currency in the payment account. In some embodiments, the authorization request may notate the application of the restricted use currency so that issuer 160 can provide that information to user 110 at a later date.

Upon receiving the authorization request, issuer 160 generates an authorization response message that indicates whether the transaction is approved or declined. The authorization response message is sent to payment processing network 150. Payment processing network 150 sends the authorization response message to the acquirer 140 who informs the merchant 130 about the result. The merchant access device may then provide the authorization response message to user 110. The authorization response message may be displayed by a merchant access device or may be printed out on a receipt.

In the exemplary embodiment described above, the payment processing network 150 performs the processing associated with restricted use currency account. In other embodiments, a server computer at the issuer 160, the merchant 130, or any other location can perform such processing.

In some embodiments, if the transaction amount is fully covered by the amount of merchant specific currency available for the transaction, payment processing network 150 may not send an authorization request message to issuer 160, and instead, may apply the merchant specific currency to pay the transaction amount. The payment processing network 150 may also generate an authorization response message on behalf of issuer 160.

In some embodiments, issuer 160 is the entity that maintains the restricted use currency account. When merchant specific currency is requested to be associated with the restricted use currency account, issuer 160 may add or associate the merchant specific currency with the account issued by issuer 160, and may otherwise indicate that the account has a certain amount of merchant specific currency. In some embodiments, payment processing network 150 may have no knowledge of the restricted use currency. The application of the restricted use currency will occur when the transaction reaches issuer 160 and not payment processing network 150.

Illustrative Example of an Exemplary Embodiment

The following example is illustrative of an exemplary embodiment whereby the restricted use currency account is maintained at the payment processing network. The principles described may apply equally when the restricted use currency account information is maintained at any other suitable location in system 100.

In this exemplary embodiment, a user has a restricted use currency account that comprises $10 of merchant specific currency for Merchant A; $5 of merchant specific currency for Merchant B; and $20 of non-specific currency. In a first transaction with Merchant A, the transaction amount is equal to $5. The user presents the restricted use currency account as payment (e.g. by presenting a payment device associated with the restricted use currency account). Because the restricted use currency account has $10 of merchant specific currency for Merchant A, $5 is used to pay for the first transaction, leaving a balance of $5 left in the restricted use currency account as merchant specific currency for Merchant A.

In a second transaction, this time with Merchant B, the transaction cost may be for $10. The user again presents the restricted use currency account as payment. This time, there is only $5 of merchant specific currency associated with Merchant B. However, there is still $20 of non-specific currency that may be used with any merchant. In this embodiment, the $5 from the merchant specific currency for Merchant B is applied to the transaction amount, leaving a remainder of $5 of the transaction amount unpaid. The non-specific currency account may then be automatically applied to pay this remainder; that is, $5 dollars is used from the non-specific currency account to pay for the remainder of the transaction. Each of these accounts is then updated to reflect the transaction, resulting in a balance of $0 for merchant specific currency for Merchant B, and $15 of non-specific currency. Thus, in this embodiment, the restricted use currency has provided the benefit of requiring a user to present only a single payment account (e.g. the restricted use currency account) and applying both merchant specific and non-specific currency to pay for the transaction without having to present a second payment account (or payment device).

In a third transaction, this time again with Merchant B, the transaction amount is equal to $20. The restricted use currency account has $5 in Merchant A specific currency; $0 in Merchant B specific currency; and $15 in non-specific currency. Thus, there is a total of $20 in the restricted use currency account. However, $5 of the currency may only be used with Merchant A. Thus, in this embodiment, the restricted use currency account does not have sufficient currency to pay for the transaction. That is, the $15 of non-specific currency may be used in the third transaction, but the $5 of Merchant A specific currency cannot be used. Thus, in this embodiment, the restricted use currency account may not be used to complete payment for the transaction. However, for the same transaction conducted at Merchant A, there would be sufficient currency because the restricted use currency account could use the $15 of non-specific currency, plus the additional $5 of Merchant A specific currency, for a total of $20.

I. Exemplary Systems

FIG. 1 shows an exemplary system according to an embodiment of the invention. Note that embodiments of the invention may use all or only some of the components shown in FIG. 1.

Referring to FIG. 1, a system for providing a restricted use currency account is illustrated 100. FIG. 1 shows a user 110, a portable consumer device 120, an access device 122, a merchant 130, an acquirer 140, a payment processing network 150 (with payment processing database 152 and server computer 154), and an issuer 160. Although one user 110, one portable consumer device 120, one merchant 130, one acquirer 140, and one issuer 160 are shown, there may be any suitable number of any of these entities in a system that provides for the use of merchant specific currency. FIG. 1 also shows user 170 (which may or may not be the same as user 110), user browser 180, the internet, and web server database (DB) interface 190.

The user 110 is in operative communication with the portable consumer device 120. Merchant 130 has an access device 122 for interacting with the portable consumer device 120 and the acquirer 140 associated with the merchant 130. Acquirer 140 is in communication with issuer 160 through payment processing network 150. In some embodiments, the merchant 130 and/or the access device 122 may also be in direct communication with the payment processing network 150.

"User" 110 can refer to an individual or organization such as a business that is capable of purchasing goods or services or making any suitable transaction with a merchant 130.

A "portable consumer device" 120 can refer to any suitable device that allows the transaction to be conducted with merchant 130. A portable consumer device 120 may be in any suitable form. For example, suitable portable consumer devices can be hand-held and compact so that they can fit into a user's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, 2-D barcodes, and the like. In other embodiments, the portable consumer device may be embodied by a virtual account or the like, and it may not be in the form of a specific physical object. A portable consumer device may be associated with (or linked to) an account, such as a restricted use currency account or a payment account.

"Merchant" 130 can refer to any suitable entity or entities that can conduct a transaction with the user 110. Merchant 130 may use any suitable method to make the transaction. For example, merchant 130 may use an e-commerce business to allow the transaction to be conducted by merchant 130 through the Internet. Other examples of merchant 130 include a department store, a gas station, a drug store, a grocery store, or other suitable business. The merchant 130 may also include a merchant computer apparatus and/or a merchant database. The merchant computer apparatus and/or merchant database may be used to store information related to the portable consumer device 120, and/or information related to a restricted use currency account. The merchant computer apparatus and/or merchant database may also communicate with payment processing network 150. In some embodiments, the merchant may also communication with Web server database (DB) interface 190.

"Access device" 122 may be any suitable device for communicating with merchant 130 and for interacting with portable consumer device 120. Access device 122 can be in any suitable location such as at the same location as merchant 130. Access device 122 may be in any suitable form. Some examples of access devices 122 include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. Access device 122 may use any suitable contact or contactless mode of operation to send or receive data from portable consumer device 120.

If access device 122 is a POS terminal, any suitable POS terminal may be used and may include a reader, a processor, and a computer-readable medium. Reader may include any suitable contact or contactless mode of operation. For example, exemplary card readers can include radio frequency (RF) antennas, optical scanners, bar code readers, magnetic stripe readers, etc. to interact with a portable consumer device 120.

"Acquirer" 140 can refer to any suitable entity that has an account with merchant 130. In some embodiments, issuer 160 may also be acquirer 140.

"Payment processing network" 150 can refer to a network of suitable entities that have information related to an account associated with portable consumer device 120. This information includes data associated with the account on portable consumer device 120 such as merchant information, merchant specific currency information, non-specific currency information, transaction information, user information, and/or any other suitable information.

Payment processing network 150 may have or operate a server computer 154 and may include a payment processor database or databases 152. The payment processor database 152 may include any hardware, software, firmware, or combination of the preceding for storing and facilitating retrieval of information. Also, the payment processor database 152 may use any of a variety of data structures, arrangements, and compilations to store and facilitate retrieval of information. Moreover, the payment processor database may comprise a restricted use currency database 210 and a payment device database 220, which are discussed in more detail with reference to FIG. 2. In some embodiments, the restricted use currency database 210 may be the same as the payment device database 220.

The server computer 154, which will be discussed in more detail with reference to FIG. 2(*a*), may be coupled to the payment processing database 152 and may include any hardware, software, other logic, or combination of the preceding for providing the desired functionality. Server computer 154 may use any of a variety of computing structures, arrangements, and compilations. For instance, server computer 154 may comprise a processor and a computer-readable medium coupled to the processor, the computer readable medium comprising code executable by the processor for implementing any of the functionality associated with providing for a merchant specific currency. The server computer 154 may be a powerful computer or cluster of computers. For example, the server computer 154 can be a large mainframe, a minicomputer cluster, or a group of servers functioning as a unit. In one example, the server computer 154 may be a database server coupled to a Web server.

Payment processing network 150 may also include data processing subsystems, networks, and operations used to support and deliver authorization services, exception file services, and clearing and settlement services. An exemplary payment processing network 150 may include VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Payment processing network 150 may use any suitable wired or wireless network, including the Internet.

"Issuer" 160 can refer to any suitable entity that may open and maintain an account associated with a payment device for user 110. Some examples of issuers may be a bank, a business entity such as a retail store, or a governmental entity. In many cases, issuer 160 may also issue a payment device associated with the account to user 110.

"Consumer" 170 can refer to an individual or organization such as a business that is capable of purchasing goods or services or making any suitable transaction with a merchant 130. In some embodiments, consumer 170 is the same as user 110. In some embodiments, the consumer may be capable of establishing a restricted use currency account and/or purchasing (or otherwise establishing) merchant specific currency and/or non-specific currency for the restricted use currency account. In some embodiments, the consumer 170 may enter other information to be associated with the restricted use currency account or set preferences for the account through user of the web server database interface 190.

As shown in FIG. 1, the consumer may interact through a consumer browser 180 run on a client computer 181 with a Web server database interface 190 to affect (or request) changes in the payment processing database. This may include creating a restricted user currency account, adding value (e.g. merchant specific or non-specific currency) to a pre-existing account, linking a payment account to the restricted use currency account, updating or providing personal information, etc. While this description describes a Web client-server based interface, it should be understood that other interfaces, such as direct connections, local network connections, kiosks, telephone interfaces or the like could be used instead to allow a cardholder to modify the restricted use currency account associated with that cardholder's account. Also as shown in FIG. 1, merchant 130 may also interact with Web server database interface 190 to establish restricted use currency accounts and or modify (or request to modify) existing restricted use currency account by, for example, adding (or requesting to add) an amount of merchant specific currency to a restricted use currency account of a user 110.

Figure 2:
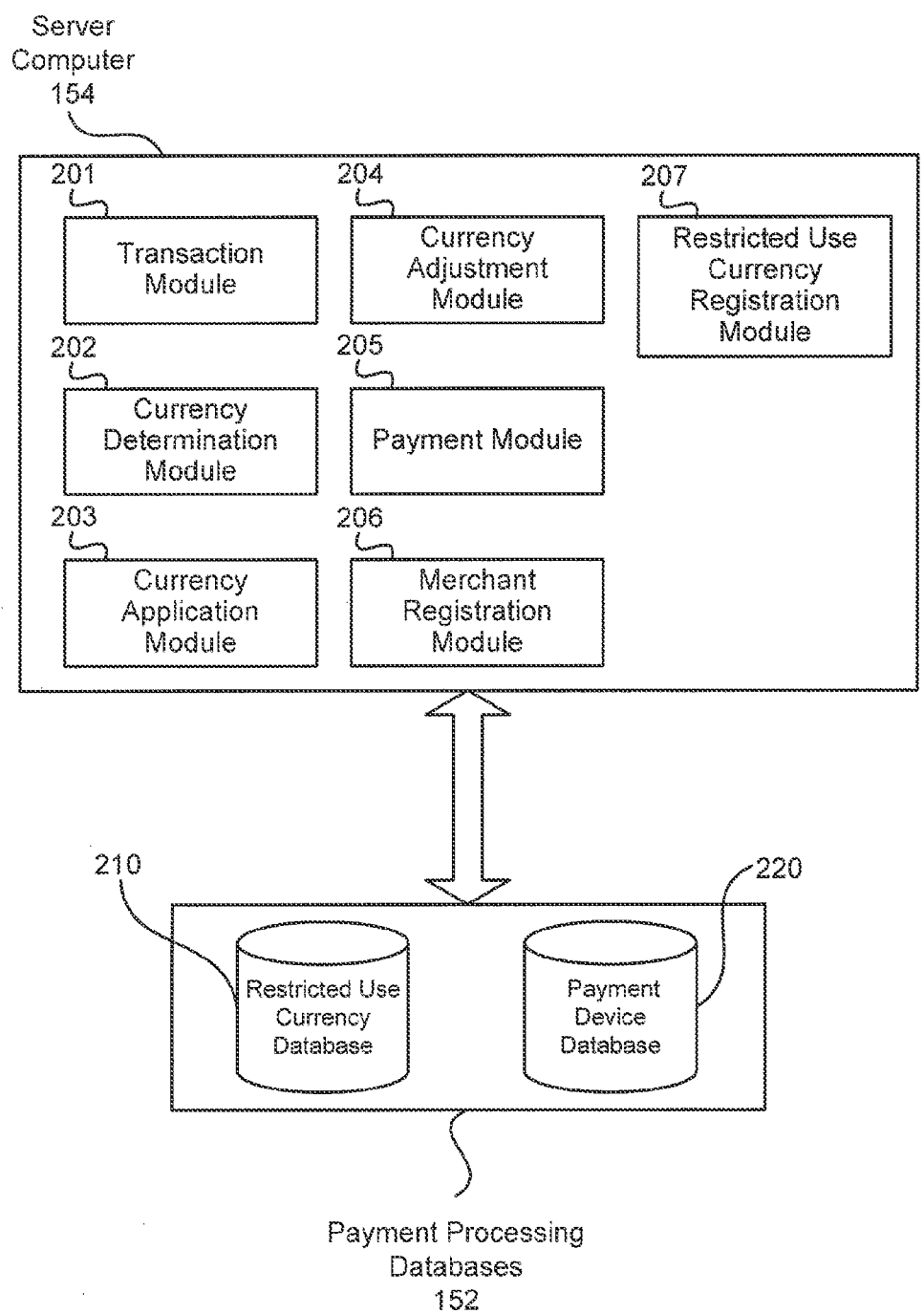
FIG. 2 shows two diagrams illustrating in more detail components that may comprise a part of the exemplary system in FIG. 1.
Figure 2:
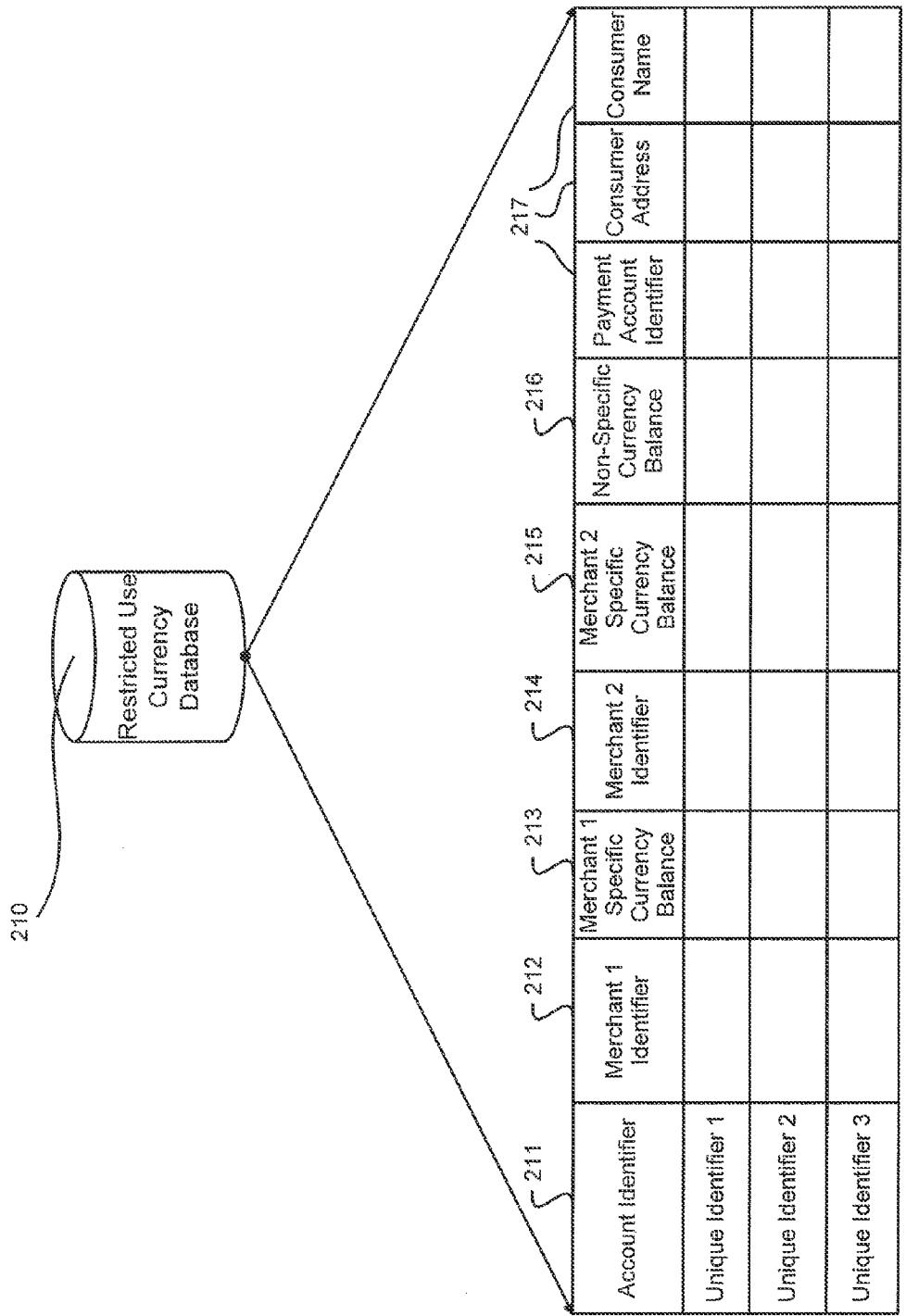

FIG. 2 comprises two diagrams illustrating components of a server computer and database for providing and/or utilizing merchant specific currency. FIG. 2 (*a*) provides a more detailed illustration of an exemplary embodiment of a system for implementing some of the functionality for providing and/or utilizing merchant specific currency, and specifically a server computer 154 that may perform functions in accordance with aspects of the present invention. This server computer 154 may, for example through the use of software instructions and/or hardware configurations, perform some or all of the functions and steps described at least with reference to FIG. 3. It should be noted that although FIG. 2 illustrates all of the modules located on a single device, the disclosure is not meant to be so limited. A system for implementing functionality related to providing and/or utilizing merchant specific currency may have additional components or less then all of these components. Additionally, some modules could be located on other devices such as a remote server or other local devices that are functionally connected to the server computer component(s).

Figure 3A:
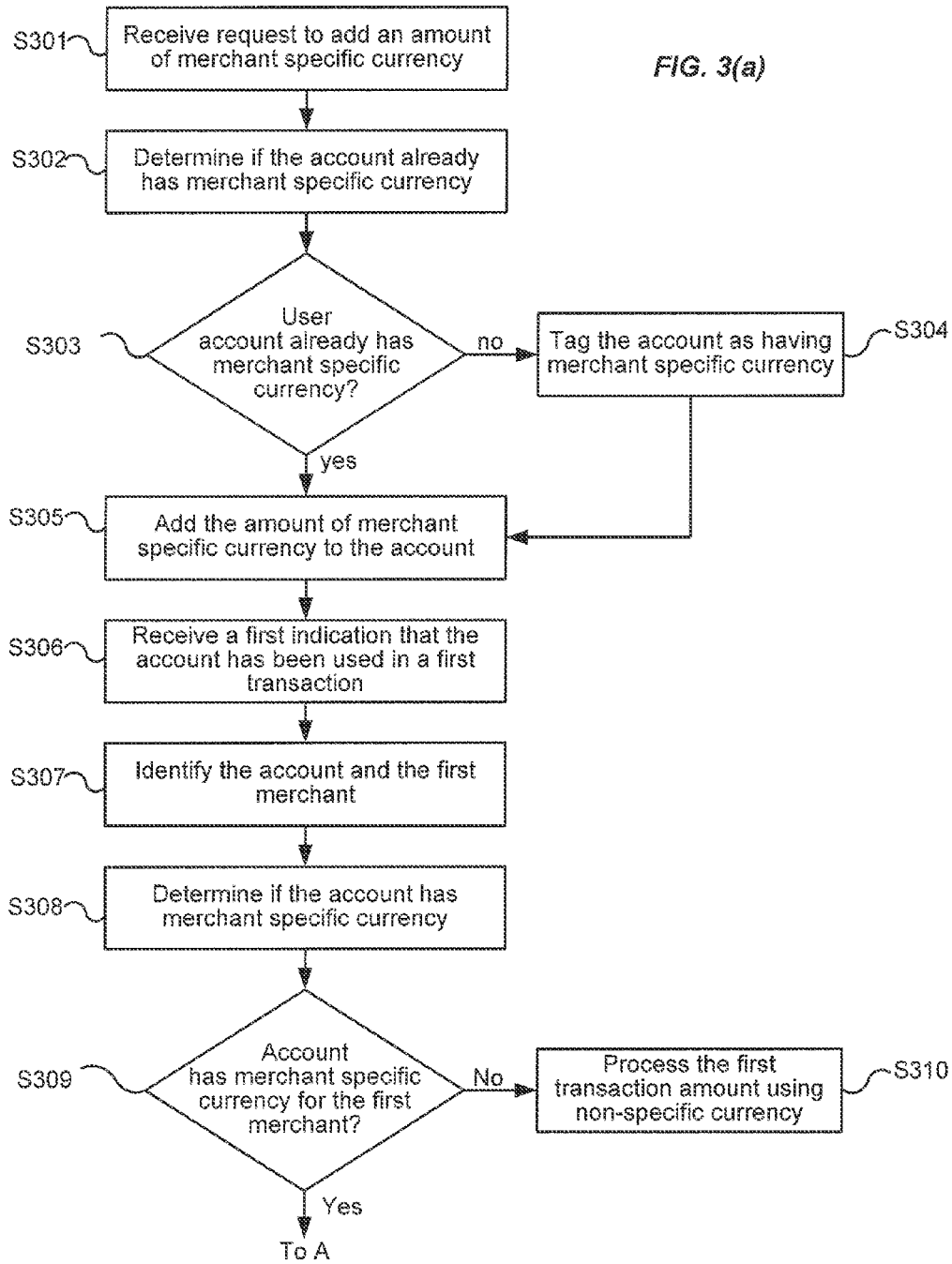
FIG. 3 shows a flowchart illustrating steps that an exemplary system may perform in providing restricted use currency.
Figure 3B:
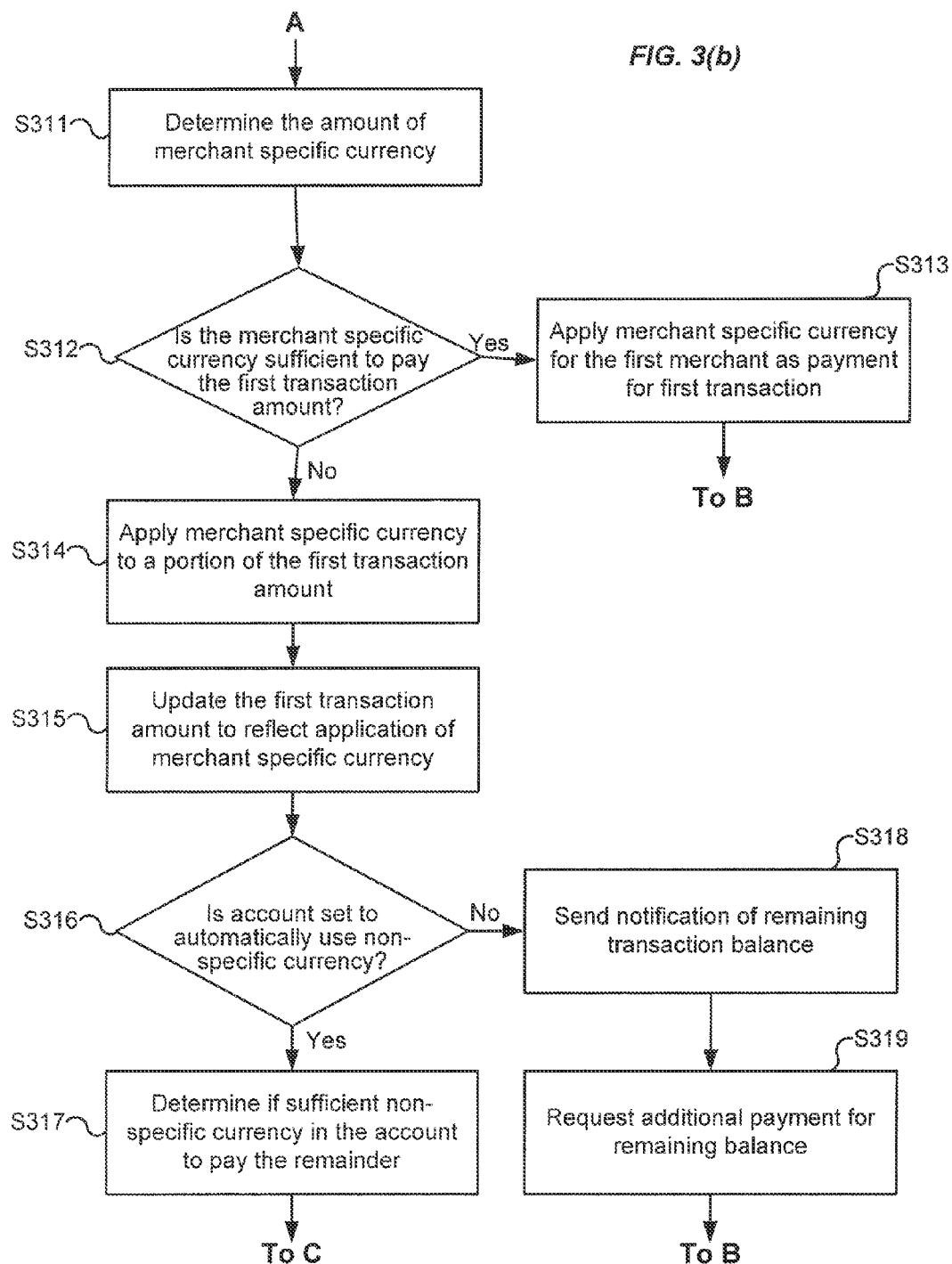
Figure 3C:
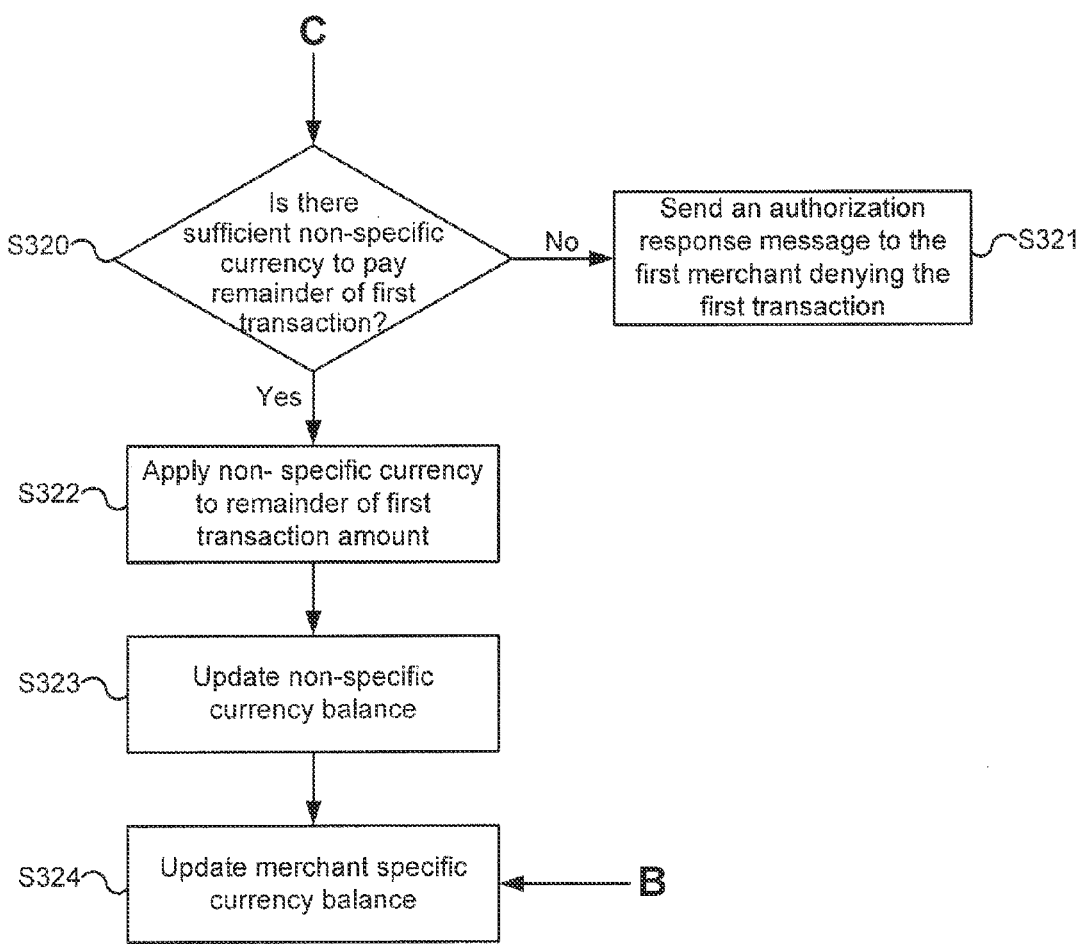

The Transaction Module 201 may be configured or programmed to perform some or all of the steps associated with the initiation of the process of providing and/or utilizing a merchant specific currency as described in FIG. 3. In this regard, the module may be configured or programmed to receive an indication that a restricted use currency account has been used in a transaction. In some embodiments, the indication may comprise an authorization request message, which may comprise data associated with the transaction such as, by way of example, a merchant identifier, an account identifier associated with an account, and/or a first transaction amount. The Transaction Module 201 may be programmed to parse and/or identify each of the types of data in the received indication of the transaction. That is, the Transaction Module 201 may identify the merchant involved in the transaction (e.g. the merchant identifier), the restricted use currency account used in the transaction (e.g. the account identifier), and/or the amount of the transaction. In some embodiments, the Transaction Module 201 may index or query the Restricted Use Currency Database 210 for information related to the restricted use currency account that was used in the transaction. The Transaction Module 201 may send or otherwise provide this, or any other information, to the appropriate modules for further processing.

In some embodiments, the Transaction Module 201 may determine if there is merchant specific currency associated with the account identifier received, and if there is not, the Transaction Module 201 may be programmed or configured to conduct the transaction as an ordinary payment transaction (for instance, when the account identifier received for the transaction corresponds to a payment account such as a credit card account, and there is no merchant specific currency associated with the account). In some embodiments, the Restricted Use Currency Database 210 may contain a flag or other component that indicates whether any merchant specific currency is associated with the account. The Transaction Module 201 may index or query the Restricted Use Currency Database 210 using the account identifier to determine if the account comprises the associated flag. This may provide the benefit that transactions may be received by, or routed through, the Transaction Module 201 without determining in advance if it involves merchant specific currency. By utilizing a flag or other indicator, this may provide a relatively limited (and fast) database lookup as to whether the account has any merchant specific currency associated with it (and thereby requires additional steps be performed related to the use of merchant specific currency, some of which are described with reference to FIG. 3) or that the account does not have merchant specific currency and the server computer 152 or other device(s) may forego those operations in handling the transaction.

The Currency Determination Module 202 may be configured or programmed to perform some or all of the steps associated with determining the amount (if any) of merchant specific currency and/or non-specific currency available for use in a transaction with a merchant. In this regard, the Currency Determination Module 202 may be programmed or configured to receive information from the Transaction Module 201 related to the first transaction, including any of the merchant identifier, account identifier (e.g. the restricted use currency account identifier), and/or the transaction amount. The Currency Determination Module 202 may be programmed or configured to determine if the restricted use currency account comprises merchant specific currency associated with the merchant that may be used to conduct the transaction, which may involve indexing or querying the Restricted Use Currency Database 210. That is, in some embodiments, Currency Determination Module 202 may be programmed or configured to index or query the Restricted Use Currency Database 210 utilizing some or all of the information received from the Transaction Module 201 (or any other module) and to receive from the Restricted Use Currency Database 210 the merchant specific currency amount for the merchant involved in the transaction (or a response that there is no merchant specific currency available for the merchant) associated with the restricted use currency account.

The Currency Determination Module 202 may also be programmed or configured to determine (e.g. based on the same, or based on a subsequent index or query of the Restricted Use Currency Database 210) information regarding any non-specific currency information associated with the restricted use currency account. This information may include, for example: the amount of non-specific currency that is available; any payment accounts (e.g. credit card accounts, bank accounts, etc.) that are associated with the restricted use currency account and/or that may comprise the non-specific currency; and/or any user preference information (such as whether to automatically apply non-specific currency to complete a transaction for which there is insufficient merchant specific currency). The module may provide this, and any other relevant information, to any of the other modules, including the Currency Application Module 203.

The Currency Application Module 203 may be configured or programmed to perform some or all of the steps associated with applying an amount of merchant specific currency and/or an amount of non-specific currency to pay for a transaction. In this regard, the Currency Application Module 203 may be programmed or configured to receive from the Currency Determination Module 202 (or any other module) any one of, or some combination of: information related to the amount of merchant specific currency associated with the merchant involved in the transaction; information related to the current transaction (e.g. the transaction amount); and/or information related to non-specific currency associated with the restricted use currency account. The Currency Application Module 203 may be programmed or configured to perform a comparison between the amount of merchant specific currency available for the transaction and the current transaction amount to determine if there is sufficient merchant specific currency to pay for the transaction. If the module determines that there is a sufficient amount of merchant specific currency to pay for the transaction amount, in some embodiments the Currency Application Module 203 may be programmed or configured to automatically apply the merchant specific currency to the transaction amount, and provide information related to this transaction (e.g. information related to the amount of merchant specific currency used to pay for the transaction) to the Currency Adjustment Module 204. The Currency Application Module 203 may also generate an authorization response message approving the transaction, which may be sent to the merchant by any of the modules of server computer 154, or any other device.

In some embodiments, if the merchant specific currency amount is determined to be insufficient to pay for the transaction amount, the Currency Application Module 203 may determine if there is a sufficient amount of non-specific currency available to pay for the remainder of the transaction amount. For instance, the Currency Application Module 203 may be programmed or configured to perform a comparison between the remainder of the transaction amount (that is, the original transaction amount less the amount of merchant specific currency available to be applied to pay for at least a portion of the transaction) and the amount of non-specific currency associated with the restricted use currency account. If the module determines that the amount of non-specific currency available is sufficient to pay the remainder of the transaction amount, then the Currency Application Module 203 may automatically apply the merchant specific currency to a portion of the transaction amount, and it may automatically apply the non-specific currency to the remainder of the transaction amount. The Currency Application Module 203 may generate an authorization response message approving the transaction, which may be sent to the merchant by any of the modules, and the module may also provide the information related to this transaction (e.g. the amount of merchant specific currency and non-specific currency used to pay for transaction) to the Currency Adjustment Module 204.

If the Currency Application Module 203 determines that there is insufficient non-specific currency to complete the transaction, the module may be programmed or configured to, for example, perform anyone of, or some combination of, the following: (1) generate an authorization response message denying the first transaction, which may be sent to the merchant by any of the modules of server computer 154; (2) automatically apply merchant specific currency to pay a portion of the transaction amount; (3) automatically apply non-specific currency to pay a portion of the remainder of the transaction amount; (4) determine the amount of the transaction that remains after merchant specific currency and/or non-specific currency is applied to the transaction amount; (5) generate and/or send a message to the merchant with information on the amount of the transaction that remains after application of the merchant specific currency and non-specific currency; and/or (6) generate and/or send a request for additional payment (such as a request for payment account information) for the amount of the transaction that remains.

In some embodiments, the Currency Application Module 203 may be programmed or configured to (1) determine if user preferences are associated with a restricted use currency account; and/or (2) apply any user preferences in conducting the transaction. For instance, a user preference may allow the computer apparatus to automatically apply non-specific currency to the remainder of a transaction if merchant specific currency is insufficient to pay for the transaction. In some embodiments, a user preference may be set to not permit automatically applying non-specific currency (or to limit the amount of non-specific currency that may be applied per transaction) to the remainder of a transaction amount if merchant specific currency is insufficient to pay for the transaction. In some embodiments, the Currency Application Module 203 may generate a request message that is sent to the merchant that requests the use of the non-specific currency to pay for the remainder of the transaction, which may be approved or declined by the user.

In some embodiments, if the non-specific currency is linked to (e.g. associated with) a payment account that requires an authorization by an issuer (e.g. a credit card account), the Currency Application Module 203 may be programmed or configured to automatically generate an authorization request message for the remainder of a transaction amount (or any appropriate amount, such as the full amount of the transaction). This request may be automatically provided to the Payment Module 205. In some embodiments, the remainder of the transaction amount may be sent to the Payment Module 205. The Currency Application Module 203 may also be programmed to receive from the Payment Module 205 an indication that the payment account has a sufficient or insufficient amount of currency available to pay for the remainder of a transaction amount. The Currency Application Module 203 may automatically apply the payment account to the remainder of the transaction amount if it receives an indication that there is a sufficient amount of non-specific currency in the payment account to pay for the remainder of the transaction. The module may also provide the information related to this transaction (e.g. the amount of merchant specific currency and non-specific currency used to pay for transaction) to the Currency Adjustment Module 204. If the Currency Application Module 203 receives an indication that there is insufficient non-specific currency in the payment account, the module may generate an authorization response message denying the transaction, which may be sent to the merchant by any of the modules of server 154.

The Currency Adjustment Module 204 may be configured or programmed to perform some or all of the steps associated with maintaining and updating information related to a restricted use currency account after a transaction is completed. The restricted use currency account information may be stored in the Restricted Use Currency Database 210. For instance, the module may be programmed or configured to receive information from the Currency Application Module 203 and/or any other module that has information regarding a current transaction and/or the restricted use currency account. The Currency Adjustment Module 204 may also query or index the Restricted Use Currency Database 210 for information, such as merchant specific currency and non-specific currency information, and also for information related to a current or previous transactions. The Currency Adjustment Module 204 may be configured or programmed to receive from the Currency Application Module 203 the amount of merchant specific currency and/or the amount of non-specific currency applied to pay for the transaction. The Currency Adjustment Module 204 may also be programmed or configured to determine the amount of each type of currency that was in the restricted use currency account prior to the transaction (for example, by querying or indexing the Restricted Use Currency Database 210, or by receiving this information from any of the modules, such as the Currency Application Module 203). The module may determine a "new" or "current" amount of currency in the restricted use currency account for both the amount of merchant specific currency and the amount of non-specific currency that may be available for a subsequent transaction. For instance, the module may be programmed or configured to reduce the previous amounts of each of the merchant specific currency and the non-specific by the amount of each type of currency that was applied to pay for the transaction. The Currency Adjustment Module 204 may also be programmed or configured to provide this information to the Restricted Use Currency Database 210.

The Payment Module 205 may be configured or programmed to perform some or all of the steps associated with utilizing non-specific currency that is linked to (i.e. associated with) a payment account to pay for a remainder of a transaction amount. In some embodiments, the Payment Module 205 may receive from the Currency Application Module 203 some or all of the information associated with a payment account, a transaction (such as an amount of non-specific currency that is needed to complete the transaction), and/or the restricted use currency account information. Upon receiving any or all of this information, the Payment Module 205 may automatically generate and/or send an authorization request to an issuer of the payment account for the amount of non-specific currency that is required to pay for the transaction (or a remainder thereof). The Payment Module 205 may also be configured to receive an authorization reply message from the issuer of the payment account, and provide (e.g. to the Currency Application Module 203) information as to whether there is a sufficient amount of non-specific currency to pay for a remainder of the transaction amount. In some embodiments, the Payment Module 205 may generate (or may use the authorization response generated by the issuer) and send to the merchant an authorization response message approving and or denying the transaction.

The Payment Module 205 may also be configured to receive from the Transaction Module 201 or the Currency Determination Module 202 information regarding transactions that do not utilize merchant specific currency. That is, if the Transaction Module 201 and/or the Currency Determination Module 202 determine that, for instance, the account identifier used in the transaction is not associated with a restricted use currency account, or that a restricted use currency account (typically a payment account that has merchant specific currency associated with it) does not have merchant specific currency for the merchant involved in the transaction, the information needed to complete the transaction may be sent to, and received by, the Payment Module 205, which may then conduct the transaction as is typically the case for use of a payment account.

The Merchant Registration Module 206 may be configured or programmed to perform some or all of the steps associated with establishing merchant specific currency for a payment account by a merchant. In some embodiments, the Merchant Registration Module 206 may be configured or programmed to perform some or all of the steps that are discussed in more detail with reference to FIG. 5. The Merchant Registration Module 206 may also provide an interface, such as a website or an application interface, for the merchant to enter relevant information for a restricted use currency account. For instance, as depicted in FIG. 1, Merchant 130 is in communication with Web server database interface 190, which in some embodiments may be generated or provided by the Merchant Registration Module 206. The module may also provide the merchant with the ability to update any of the merchant related information stored in the Restricted Use Currency Database 210, including the amount of merchant specific currency available for a restricted use currency account.

The Restricted Use Currency Registration Module 207 may be configured or programmed to perform some or all of the steps associated with creating or updating a restricted use currency account by a consumer. In this regard, the module may provide an interface (such as the web server database interface 190 shown in FIG. 1) for the consumer to enter information and establish an account. The interface, along with some or all of the functionality that this module may be configured or programmed to provide, will be discussed in more detail with reference to FIG. 6. The module may receive and/or store any of the received consumer information associated with an a restricted use currency account in the Restricted Use Currency Database 210. Moreover, the Restricted Use Currency Registration Module 207 may also facilitate commercial transactions with one or more merchants, such as by providing the ability of consumers to purchase merchant specific currency for a particular merchant or merchants. The module may also be configured or programmed to provide the user the ability to provide non-specific currency, including linking or associating the restricted use currency account with a payment account.

The Payment Processing Database 152 may include one or more databases including an Restricted Use Currency Database 210, which will be described in more detail with reference to FIG. 2(b), and a payment device (or payment account) database 220. In some embodiments, the Restricted Use Currency Database 210 and the payment device database 220 may comprise the same database. Each of these databases may comprise more than one database, and may be located in the same location or at different locations. The payment device database 220 may contain information related to payment account, which may be embodied, for example, in a portable consumer device. As noted above, in some embodiments, a restricted use currency account may comprise a payment account (e.g. merchant specific currency may be associated with the payment account) or a payment account may be associated with a restricted use currency account (e.g. the payment account may be linked to the restricted use currency account).

FIG. 2(b) provides a more detailed illustration of an exemplary embodiment of a Restricted Use Currency Database 210. As noted above, Restricted Use Currency Database 210 may comprise more than one database, and the databases may be in the same location or may be remotely located. Moreover, the Restricted Use Currency Database 210 may comprise a single database or a single set of databases with the payment device database 220. The Restricted Use Currency Database 210 may be configured to contain some or all of the information associated with a restricted use currency account. Some possible categories of information that may be stored in the database will be discussed below.

The Restricted Use Currency Database 210 may include an account identifier 211. This may be similar to an account number, and may be unique to a single restricted use currency account. Providing a unique identifier 211 may permit a restricted use currency account to be unique to each user (that is, it may include specific information related to that user), and may allow the user to add currency using a payment account and/or link a payment account to the restricted use currency account. Moreover, the restricted use currency account may be associated with one, or more than one, merchant. In some embodiments, the restricted use currency account may be a payment account, and may therefore comprise a payment account number.

The merchant identifier 212 may by a unique identifier of a merchant or may identify a group of merchants that may have common element or agreement. That is, in some embodiments, a group of merchants may be designated for use with a single instance of merchant specific currency (e.g. the group of merchants may have a single merchant identifier or multiple identifiers could be associated with the same merchant specific currency balance 213). For instance, a group of merchants selling similar goods or participating in a cross promotional agreement may create a single merchant specific currency identifier 212 that may be used/accepted by each merchant in the group (it should be noted, that this group is still specified, and the merchant specific currency cannot be used outside of transactions with the selected group). The merchant identifier 212 may permit multiple merchants to provide/accept merchant specific currency for use of the same restricted use currency account (e.g. the restricted use currency account, which may be linked to a payment device, may serve as a universal merchant specific currency account that may be used at a plurality of participating merchants). The Restricted Use Currency Database 210 may therefore have multiple merchant identifiers 212 associated with a single restricted use currency account.

The merchant specific currency balance 213 represents the amount of merchant specific currency for an associated merchant in a restricted use currency account. When a transaction occurs at (or with) a merchant (e.g. a merchant having merchant identifier 212), a determination may be made as to whether the merchant specific currency balance 213 is sufficient to cover the transaction amount, as will be described with reference to FIG. 3. After a transaction occurs in which merchant specific currency is applied to pay for at least a portion of the transaction amount, the merchant specific currency balance 213 may be reduced by the amount that was used in the transaction (e.g. by Currency Adjustment Module 204). In some embodiments, the merchant specific currency balance is maintained at the payment processing network 150 so as to not require that an authorization request be sent to an issuer of an account (or of a payment account) for each transaction involving restricted use currency. That is, in some embodiments when a transaction involving a restricted use currency account occurs, the transaction may be approved by the payment processing network 150 based on a determination that the amount of merchant specific currency and/or the amount of non-specific currency (that may or may not be associated with a payment account) either alone, or in some combination, have sufficient currency to pay the transaction amount. This may facilitate more efficient processing of transaction information, as it may reduce the number of requests transmitted to, and received from, an additional participant (e.g. the issuer). In some embodiments, the merchant specific currency balance 213 may be increased by a merchant (such as a merchant having merchant identifier 212), an issuer (such as the issuer of the restricted use currency account), the user, and/or a consumer (for instance, through the use of web server database interface 190 or by a financial transaction with a merchant—such as a transaction akin to purchasing a gift card, which will be described with reference to FIG. 6).

The merchant identifier 212 and merchant specific currency balance 213 are illustrated in FIG. 2(b) to show that multiple merchants, each having a merchant specific currency amount (e.g. balances 213 or 215), may be associated with a single restricted use currency account. These components are functionally equivalent to merchant identifier 212 and merchant specific currency balance 213, described above. It should be understood that, in some embodiments, any number of merchants (or a select group of merchants) may be accommodated (subject only to restrictions on the actual hardware or software, such as the database infrastructure, of the system).

The non-specific currency balance 216 refers to an amount of currency that may be used with any merchant. That is, as defined above the non-specific currency is not associated with a particular merchant or group of merchants. In some embodiments, the non-specific currency balance 216 may be used to pay for at least a portion of a transaction amount, such as a remainder of a transaction amount after merchant specific currency has been applied. After a transaction occurs in which non-specific currency is applied to pay for at least a portion of the transaction amount, the non-specific currency balance 216 may be reduced by the amount that was used in the transaction (e.g. by Currency Adjustment Module 204). In some embodiments, the non-specific currency balance is maintained at the payment processing network 150 so as to not require that an authorization request be sent to an issuer of the restricted use currency account (and/or the issue of a payment account) for each transaction involving non-specific currency. In some embodiments, the non-specific currency may comprise a payment account, and the step of automatically applying the non-specific currency to a remainder of a transaction (which may be performed by Currency Application Module 203) may comprise sending an authorization requires to an issuer of the payment account. In some embodiments, when the non-specific currency is linked to (e.g. associated with) a payment account, the non-specific currency balance 216 may not be applicable. This may be because, for instance, the total account balance may be maintained at the issuer of the payment account. In some embodiments, when a payment account comprises the non-specific currency, a user may set preferences that include the maximum amount of non-specific currency that may be used for a transaction. In some embodiments, a user may also set the amount of non-specific currency that may be used for all transactions, and this may be maintained in a similar manner as the non-specific currency balance 216 is maintained for embodiments wherein the non-specific currency may be pre-paid currency similar to the merchant specific currency (e.g. similar to a pre-paid gift card or merchant promotion).

The restricted use currency account may comprise various other information, including user information 217 such as the user's address and the user's name. This information may be used to authenticate transactions, to send promotional items, to track transaction activity, to send other special offers, to report account activity (such as reporting to the user any transactions and transaction amounts), etc. As described above, in some embodiments a payment account may be linked to the restricted use currency account. The payment account may be used to provide non-specific currency for the restricted use currency account. The payment account identifier may thereby be included with the user information 217 so that, for instance, if non-specific currency is to be applied to a portion of a transaction, the payment account identifier may be utilized by, for instance, Currency Application Module 203 and/or Payment Module 205 to apply the non-specific currency. The payment account information may also be used during the user registration or account maintenance processes to add merchant specific currency and/or non-specific currency to the account. In some embodiments, the payment account information may be that of a consumer that is different from the user. The payment account information may be stored and/or associated with the restricted use currency account for convenience so as to allow the consumer to readily purchase or provide additional merchant specific currency and non-specific currency (through Restricted Use Currency Registration Module 207) to a user's restricted use currency account. Other examples of information that may be associated with a restricted use currency account include user name, a credit card number, a checking account number, a savings account number, a social security number, a passport identification number, a drivers license number, an address, and an age.

It should be understood by one of ordinary skill in the art that while the exemplary embodiments of the system discussed above describe the software and/or hardware modules for implementing the merchant specific currency with reference to the server computer 154 and the payment processing database 152 at the payment processing network 150, in alternative embodiments any or all of these modules and/or the information stored in the payment processing database 154 may be located in any suitable location. For instance, embodiments may locate some or all of the modules at the merchant 130 and may utilize a merchant computer apparatus and/or the merchant database. In such embodiments, merchant specific currency available for a transaction may be determined at the merchant 130 without the requirement of utilizing the payment processing network 150. Other embodiments may locate the modules, the information, and/or perform steps as described above at other locations such as at the access device 122, the acquirer 140, the issuer 160, or any combination of the above. In some embodiments, where the non-specific currency comprises a payment account, it may be preferable to locate at least some of the system described above at the issuer of the payment account 160, as it may be necessary to determine the amount of currency available in the payment account to approve a transaction.

It should also be understood by one of ordinary skill in the art that although the merchant specific currency was described with reference to a merchant and/or a consumer establishing a restricted use currency account or adding merchant specific currency and/or non-specific currency to a restricted use currency account, the system and methods are equally applicable if the merchant specific currency and non-specific currency are provided by another party such as the issuer 160. For instance, the issuer may provide merchant specific currency and associate the merchant specific currency with a payment account (which may in some embodiments comprise the non-specific currency) is first issued, which may promote both the application for a payment account and the use of the account after it was been initiated. In some embodiments, the issuer and/or the merchant may set the amount of merchant specific currency to associate with the payment account (e.g. the restricted use currency account in this embodiment). The system and the relevant modules described above may perform similar functions, and may simply substitute the issuer as the entity that establishes or adds merchant specific currency to an account. Alternatively or congruently, the merchant and the issuer may jointly provide merchant specific currency and establish conditions as to when and the amount.

II. Exemplary Methods

Methods according to exemplary embodiments of the invention can be described with respect to FIGS. 3-6.

A. Exemplary System Method

FIG. 3 illustrates an example of how the exemplary system described above may provide for the use of merchant specific currency. While the below method will be described with respect to the use of the payment processing network 150, the payment processing database 152, and the server computer 154, as noted above, the components and/or the performance of any steps described below may be located anywhere in the system.

With reference to FIG. 3(a), at step S301 the exemplary system receives a request to add an amount of merchant specific currency associated with a first merchant to a restricted use currency account (it should be noted that exemplary embodiments of this process will be described in more detail with reference to FIGS. 5 and 6). As described above, any entity in the system 100 may provide or otherwise make available additional merchant specific currency and/or non-specific currency for a restricted use currency account. In some embodiments, the request may originate from a consumer and may utilize the web server database interface 190 (through consumer browser 180 and the internet) as shown in FIG. 1 to initiate an account and/or update information related to a restricted use currency account. This process may be facilitated or provided by, for example, the Restricted Use Currency Registration Module 207. In some embodiments, the request may originate from a merchant, which may also use the Web server database interface 190 to update or change information related to a restricted use currency account. This process may be facilitated by Merchant Registration Module 206.

At step S302, the exemplary system may determine if the restricted use currency account contains merchant specific currency associated with the first merchant. In some embodiments, this determination may be made by receiving and/or determining a merchant identifier 212 associated with the first merchant and then indexing or querying the Restricted Use Currency Database 210 for a Merchant Specific Currency Balance 213 associated with the merchant identifier 212. This determination may be performed by the Merchant Registration Module 206, the Restricted Use Currency Registration Module 207, or Currency Determination Module 202, although any suitable component of the system may perform the determination.

At step S303, if the system determines that the user account does not already have merchant specific currency associated with the first merchant (for example, if no merchant specific balance is returned for the merchant identifier and/or the Restricted Use Currency Database 210 does not have an entry corresponding to the merchant identifier), at step S304 a tag may be added to the account indicating that there is now merchant specific currency associated with the first merchant. The tag may comprise creating an entry associated with the Merchant Identifier 212. The tag may be added to Restricted Use Currency Database 210 by any of the Merchant Registration Module 206, Restricted Use Currency Registration Module 207, or Currency Determination Module 202. The use of a tag may facilitate a faster look up as to whether a restricted use currency account has merchant specific currency associated with a merchant.

At step S305, the requested amount of merchant specific currency may be added to the restricted use currency account. This may be performed as part of a registration or updating process. In some embodiments, the process of adding currency to a restricted use currency account may be performed by the Merchant Registration Module 206, the Restricted Use Currency Registration Module 207, and/or the Currency Adjustment Module 204. For instance, the Merchant Registration Module 206 or Restricted Use Currency Module 207 may determine the amount of currency to add to the restricted use currency account and may then send this information to the Currency Adjustment Module 204. The Currency Adjustment Module 204 may perform a similar process that was described above with respect to updating the Restricted Use Currency Database 210 following a transaction (that is, for example, it may determine the current merchant specific currency balance, and add the identified amount of currency to the restricted use currency account). In some embodiments, Merchant Registration Module 206 or Restricted Use Currency Module 207 may perform the adding of currency directly. In this manner, embodiments of the system may provide a means of adding merchant specific currency to a restricted use currency account, which may be later accessed through utilization of the Restricted Use Currency Database 210.

At step S306, the exemplary system receives a first indication that a restricted use currency account has been used in a first transaction with the first merchant. For instance, this indication may be received by the Transaction Module 201, which may be located on server computer 154. Other embodiments may, for example, locate the Transaction Module 201 at a merchant or issuer computer apparatus. The indication of the transaction may comprise an authorization request message, and in some embodiments may include information such as an account identifier (e.g. the restricted use currency account identification number 211), a merchant identifier 212, and/or transaction specific information such as, for example, the total cost of the transaction, the type of transaction, and/or any other information that may be included by the merchant or the consumer. The received indication may be in the form of a message, and may include one or more data packets. However, any manner of indicating a first transaction may be used.

At step S307, the system identifies the restricted use currency account 211 and the merchant identifier 212 associated with the first transaction. This may be performed by the Transaction Module 201 and may be done using any known method, including parsing the information that is included in the received transaction indication (e.g. in the authorization request message).

As described above, a restricted use currency account may be associated with multiple merchants, each of which may have different merchant specific currency balances 213 for the restricted use currency account involved in the first transaction. Thus, at step S308 the system may determine if the account has merchant specific currency associated with the first merchant. For instance, in some embodiments, the system may utilize the restricted use currency account identifier 211 and/or the merchant identifier 212 (which were determined in step S307) to locate information within the Restricted Use Currency Database 210 and determine if there is a merchant specific currency balance 213 and/or non-specific currency balance 216 (and any other related information) that may be utilized for the first transaction. For example, the Restricted Use Currency Database 210 may be first indexed by the Transaction Module 201 or the Currency Determination Module 202 using the restricted use currency account identifier 211. Then, any information (e.g. merchant specific currency balance) that is related to the restricted use currency account for the first merchant involved in the first transaction may then be identified using the merchant identifier 212. In some embodiments, a flag may be used to indicate whether there is merchant specific currency associated with a particular merchant. However, as would be understood by one of ordinary skill in the art, any manner of determining the merchant specific currency information for the restricted use currency account and the merchant involved in the first transaction may be used.

At step S309, if the system determines that the restricted use currency account does not have merchant specific currency that is available for use in the first transaction with the first merchant, then at step S310 the system may process the first transaction using non-specific currency associated with the account. In this way, the restricted use currency account may be used for merchants for which there is no merchant specific currency associated (or available to use) with a merchant involved in a transaction. As described above, the non-specific currency could be a pre-paid account (similar to a pre-paid gift card), which the system may automatically apply to pay for the transaction, as was described with reference to FIG. 2(*a*) and the functionality of the Currency Application Module 203 and the Currency Adjustment Module 204. In some embodiments, the non-specific currency account may comprise a payment account, which may also be automatically utilized to pay for the transaction amount utilizing, for instance, Payment Module 205. If there is no non-specific currency that is available for use in the first transaction, or an insufficient amount of non-specific currency to pay for a transaction amount, then the system, such as Transaction Module 201, Currency Application Module 203, and/or Payment Module 205 (any of which may be located at server computer 154) may send an authorization response message to the merchant denying the first transaction. In some embodiments, if there is non-specific currency associated with the restricted use currency account, but it is insufficient to pay for the transaction amount, the balance (or a potion thereof) of the non-specific currency may be applied to a portion of the transaction amount, and any of the modules may send an authorization response message requesting additional payment from the user to complete the transaction.

If it is determined at step S309 that the restricted use currency account does have merchant specific currency available for use in the first transaction, then at step S311 the amount of the merchant specific currency available may be determined. For example, the Restricted Use Currency Database 210 may be indexed by the Transaction. Module 201 or the Currency Determination Module 202 using the restricted use currency account identifier 211. Any information (e.g. merchant specific currency balance 213) that is related to the restricted use currency account for the first merchant involved in the first transaction may then be identified using the merchant identifier 212. In some embodiments, the steps S309 and S311 may be performed simultaneously; that is, in determining whether merchant specific currency is available for use in the first transaction, the amount of such currency may also be determined and retrieved by the exemplary modules shown in FIG. 2(*a*) from Restricted Use Currency Database 210.

At step S312, a determination may be made as to whether there is sufficient merchant specific currency to pay for the first transaction amount. In some embodiments, this determination may be made, for example, by the Currency Application Module 203, which compares the amount of merchant specific currency balance 213 (which may have been received or obtained from the Restricted Use Currency Database 210 by the Currency Determination Module 202) with the transaction amount. However, a person of ordinary skill in the art would understand that any way of comparing the merchant specific currency available with the transaction amount may be used.

In some embodiments, if the merchant specific currency is sufficient to pay for the transaction amount, then the method proceeds to step S313 where the merchant specific currency associated with the first merchant may be automatically applied to pay for the transaction. In some embodiments, the step of automatically applying the merchant specific currency may be performed by the Currency Application Module 203, as was described above with reference to FIG. 2(*a*). Following the application of the merchant specific currency to the transaction amount, the system may proceed to step S324 where the merchant specific currency balance 213 associated with the first merchant may be updated. As was described above with reference to FIG. 2(*a*), the update of the merchant specific currency may be performed by the Currency Adjustment Module 204 by, for example, reducing the initial merchant specific currency balance by the amount applied to the transaction, and then updating the entry in the Restricted Use Currency Database 210.

Returning to step S312, if the merchant specific currency amount is determined not to be sufficient to pay for the first transaction amount, then in some embodiments the process may proceed to step S314. At step S314, the merchant specific currency that is available, while not sufficient to pay for the entire transaction amount, may be automatically applied to a portion of the transaction amount. This application of merchant specific currency may be performed in the same manner as was described above with respect to application of merchant specific currency in step S313, and may for example by performed by the Currency Application Module 203 (albeit for less than the entire transaction amount).

At step S315, the first transaction amount may be modified or reduced by the amount of merchant specific currency that was applied to pay for the transaction. This may be performed, for example, by Currency Application Module 203 or Currency Adjustment Module 204. The new transaction amount represents the remainder of the transaction amount.

At step S316, the system may determine if the user has a preference set to automatically apply non-specific currency to complete a transaction (or any other preferences that may affect whether non-specific currency may be applied to the transaction amount). As was mentioned above (and will be described in more detail below with respect to FIG. 6), the Restricted Use Currency Registration Module 207 and/or Web server database Interface 190 may provide a consumer 170 (which may be the same as the user 110 involved in the transaction) with the ability to add or adjust preferences related to the restricted use currency account. In some embodiments, a consumer may set a preference as to whether to apply non-specific currency to transactions where there is insufficient merchant specific currency to pay for the transaction (other examples of preferences may include the type of transactions that non-specific currency may be applied to, the amount that may be applied, etc.). The system, for example Currency Application Module 203, may check these preferences (which be stored, along with other restricted use currency account information, in Restricted Use Currency Database 210) to determine whether to apply non-specific currency (if available) to pay for at least a portion of the transaction.

If at step S316 it is determined that non-specific currency is not to be automatically applied, then the process may move to step S318 where a notification (e.g. an authorization response message) may be sent to the merchant and/or the user comprising the remainder of the transaction amount after the application of merchant specific currency. At step S319, the system may request additional payment for the remaining balance. This request may comprise requesting authorization to apply non-specific currency that is associated with the restricted use currency account to pay for the remainder of the transaction amount. That is, in some embodiments, there may be sufficient non-specific currency to complete the transaction, but the user must provide additional conformation or authorization to utilize that currency. The request and authorization may, for instance, comprise a message to the user displayed at a POS terminal or on a website requesting that the user confirm use of the non-specific currency. This may be particularly be the case for embodiments where the non-specific currency comprises a payment account, such as a credit card account. These embodiments may provide the user the convenience of only needing to present one payment device (e.g. representing the restricted use currency account) and being able to pay for a transaction with both merchant specific currency and non-specific currency; but also provides the ability to monitor and control spending by having the additional step of determining whether the non-specific currency is actually used in a transaction. This may prevent a user from spending more than a merchant the amount of merchant specific currency, which may be undesirable. Following the application of the merchant specific currency to the transaction amount, the system may proceed to step S324 where the merchant specific currency balance 213 associated with the first merchant may be updated.

If at step S316 it is determined that non-specific currency is to be automatically applied, then at step S317 a determination may be made as to whether there is sufficient non-specific currency in the restricted use currency account to pay the remainder of the transaction. This may be done, for example, by comparing the remainder (which was determined in step S315) with the amount of non-specific currency available for the transaction. The non-specific currency available for use in the transaction may be determined, for example, by querying or indexing the Restricted Use Currency Database 210 (e.g. by the Currency Determination Module 202). However, a person of ordinary skill in the art would understand that any way of comparing the non-specific currency available with the remainder of the transaction amount may be used. In some embodiments, and as discussed above, determining the amount of non-specific use currency available may comprise sending an authorization request to an issuer of a payment account associated with the restricted use currency account. This may be effectuated, for example, by Payment Module 205. In this regard, in some embodiments the step of automatically applying non-specific currency (see step S322 below) may comprise the same process as determining whether there is sufficient non-specific currency to pay for a remainder of a transaction amount.

If at step S320 it is determined that there is insufficient non-specific currency to pay a remainder of the first transaction amount, than the exemplary method may proceed to step S321. As show in FIG. 3, at step S321 the system may send an authorization response message to the first merchant denying the first transaction. This message may be sent by any of the modules disclosed in FIG. 2(a), such as Transaction Module 201, Currency Application Module 203, and/or Payment Module 205 (any of which may be located at server computer 154). In some embodiments, rather than denying the transaction, the system (by way of, for instance, the Currency Application Module 203) may automatically apply the non-specific currency amount to the remainder of the transaction, and return a message that comprises the remaining balance of the transaction after the merchant specific currency and the non-specific currency were applied to the transaction amount.

If at step S320 it is determined that there is sufficient non-specific currency to pay for the remainder of the transaction amount, then the exemplary method illustrated in FIG. 3 may proceed to step S322. At step S322, an amount of non-specific currency may be automatically applied to the remainder of the first transaction amount to complete payment for the transaction. As described above this may be performed, for instance, by Currency Application Module 203. In some embodiments, thereby, merchant specific currency may automatically be applied to pay for a portion of the first transaction with a merchant, and non-specific currency may be automatically applied to pay for the remainder of the transaction that was greater than the amount of merchant specific currency. In some embodiments, automatically applying non-specific currency may comprise sending an authorization request to an issuer of payment account for the remainder of the transaction amount. This process may be similar to the process that is typically effectuated for payment using a payment account. In the exemplary apparatus illustrated in FIG. 2, this may be performed by Payment Module 205.

At step S323, the system and method may update the non-specific currency balance 216 to reflect the application of the non-specific currency. That is, in some embodiments, the non-specific currency balance 216 in Restricted Use Currency Database 210 may be updated to reflect a decrease equal to the amount that was applied to the transaction. This may be done, for example, by the Currency Adjustment Module 204. Similarly, at step S324 the merchant specific currency balance for the first merchant may also be updated to reflect the amount applied to the transaction. That is, in some embodiments, the non-specific currency balance 213 in Restricted Use Currency Database 210 may be updated to reflect a decrease equal to the amount that was applied to pay for the transaction.

It should be understood that the above description is for illustration purposes and is not meant to be limiting. Indeed, FIG. 3 describes an exemplary method that may be performed for utilizing merchant specific currency. Other embodiments may utilize slightly different steps or may perform the steps in a slightly different order, or in a way that does not alter the functionality provided by the system. Each of these embodiments is contemplated as within the scope of this disclosure. Some examples of additional exemplary embodiments are as follows:

In some embodiments, at S314 before automatically applying the merchant specific currency to pay for a portion of the transaction, the system may first determine if there is sufficient non-specific currency to pay the remainder of the transaction amount (a process which was described with respect to step S317). If it is determined that there is sufficient non-specific currency to pay for a remainder of the first transaction amount, then the system may apply both the merchant specific currency to a portion of the transaction amount, and apply the non-specific currency to any remainder to complete the transaction. The process may then continue with steps S323. In some embodiments, if it is determined that there is insufficient non-specific currency to complete the transaction, the system may provide an authorization response message that rejects the transaction (which may comprise a similar process to the authorization response message described with respect to S309, and may be performed by, for example, the Currency Application Module 203 or the Payment Adjustment Module 205) that may be sent to the merchant. In some embodiments, if it is determined that there is insufficient currency to complete the transaction, the system may (1) automatically apply the merchant specific currency to a portion of the first transaction amount, (2) automatically apply any non-specific currency to a portion of the remainder of the transaction amount, and/or (3) send an authorization response message that provides the updated transaction amount (e.g. the initial transaction amount less the amount of merchant specific and non-specific currency applied) and/or requests additional payment (e.g. a payment account) be provided to complete the transaction. It should be understood that the principles discussed herein may apply equally to any all such embodiments, and that these embodiments are again illustrative and not meant to be limiting.

For instance, although the above description discusses the function of the server computer 154, which is located between the issuer 160 and the acquirer 140, it is understood that it is possible to have the above described functionality performed by a similar computer at the issuer, acquirer, or even the merchant in some embodiments.

B. Exemplary Method Including User Actions

Figure 4:
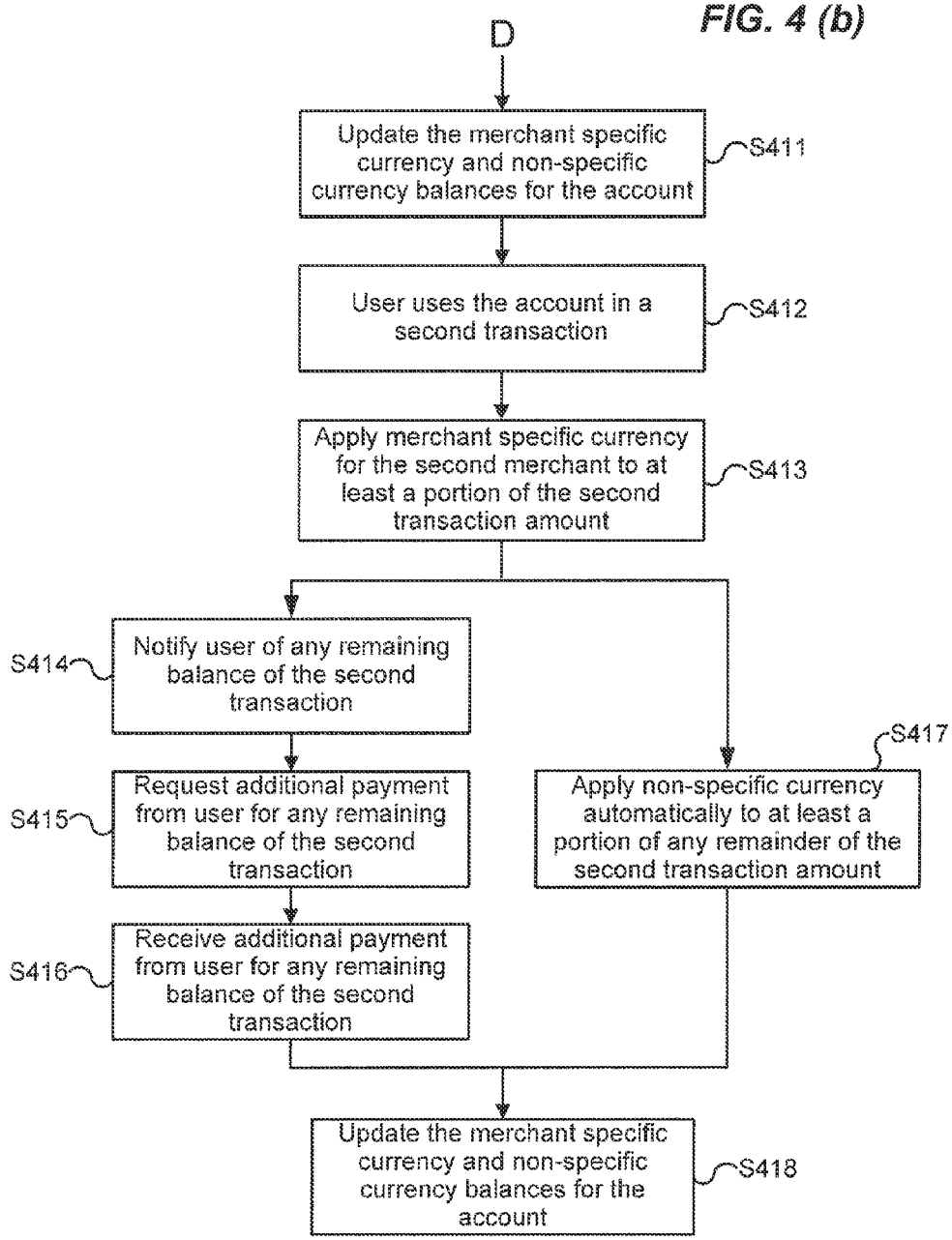
FIG. 4 shows a flowchart illustrating steps that may be involved in some embodiments for providing and using restricted use currency.

FIG. 4 illustrates an example of an exemplary process that describes the use of restricted use currency account. With reference to FIG. 4(a), at step S401 a restricted use currency account is provided to a user. In some embodiments, this may comprise, for example, issuing a new payment account (e.g. a credit card or bank account) to the user that may comprise merchant specific currency. In some embodiments, this may comprise a consumer purchasing a restricted use currency account, or otherwise providing merchant specific funding for the account. In some embodiments, this may be akin to purchasing a gift card (that is, it is prepaid with actual currency). In some embodiments, which will be discussed with further reference to FIG. 6, this may comprise providing a web interface (or other interface that a consumer may interact with) in which a consumer may set up and establish the merchant specific currency and or the restricted use currency account. However, any method of providing a restricted use currency account to a user, including handing payment devices linked to restricted use currency accounts (e.g. as part of a promotion) may be used.

At steps S402-S404, merchant specific currency for a first and a second merchant may be added to, or associated with a restricted use currency account, along with an amount of non-specific currency. Exemplary embodiments of a process related to a merchant's participation in this process are discussed with regards to FIG. 5, and consumer's participation in these steps will be described in detail with reference to FIG. 6. It should be understood that merchant specific currency may be added to an account by any entity shown in system 100, and perhaps other suitable entities as would be understood by one of skill in the art. Moreover, there is no limit to the number of merchants that may have merchant specific currency associated with a restricted use currency account. In addition, merchant specific currency may be added to the account at anytime, and may be in essence reloaded if a balance for a specific merchant begins to get low. As noted above, the non-specific currency may be added in the same manner as the merchant specific currency, and may reflect a payment by the consumer or user (e.g. like a gift card). In some embodiments, and as discussed above, the non-specific currency may be associated with a payment account, such as a credit card account.

At step S405, the user may present the restricted use currency account as payment in a first transaction with a first merchant. In some embodiments, the account may comprise merchant specific currency for the first merchant, which may only be used for that particular merchant (or perhaps a select group of merchants). The user may "use" the account in first transaction by, for example, presenting a payment device that is associated with the restricted use currency account, such as a payment card having embedded therein the unique identifier for the restricted use currency account. However, anyway of presenting a payment account in a transaction may be used, as would be understood by one of ordinary skill in the art.

At step S406, the merchant specific currency for the first merchant is applied to at least a portion of the first transaction amount. That is, if there is sufficient merchant specific currency to pay for the transaction amount, then the entire amount of the transaction may be paid for using the merchant specific currency (in that case, the exemplary process may move to step S411). An exemplary process for determining whether there is a sufficient amount of merchant specific currency to pay for a transaction was detailed above with respect to step S312. It should be understood, that any suitable method for determining whether there is sufficient merchant specific currency may be used. Moreover, the process of automatically applying merchant specific currency was discussed in detail with respect to step S314. In some embodiments, if the amount of merchant specific currency associated with the first merchant is insufficient to cover the first transaction amount, then the merchant specific currency that is available may still be applied to pay for at least a portion of the first transaction amount.

As was discussed above, in some embodiments, a restricted use currency account may have user preferences associated with particular aspects including whether to automatically apply non-specific currency if the merchant specific currency is insufficient to pay for a transaction amount. In some embodiments, the non-specific currency is automatically applied. As illustrated in FIG. 4(a), if the restricted use currency account is configured to automatically apply non-specific currency to any remainder of a transaction amount, then the exemplary process proceeds to step S410. In some embodiments, this may comprise sending an authorization request to the issuer of an account for the remainder of the transaction amount. In some embodiments, the non-specific currency may be applied in same manner as the merchant specific currency account, that is by use of a database that maintains the balances along with the settlement process typical in a payment processing network 150.

In some embodiments, the restricted use currency account is not configured to automatically apply non-specific currency to a remainder of a transaction amount. This is illustrated in the exemplary method shown in FIG. 4(a) steps S407-S409. In some embodiments, when non-specific currency may be required to complete a transaction, the user may receive a notification at step S407 of the remaining balance after any merchant specific currency has been applied to the transaction amount. The notice may be in any suitable form, including an authorization request message at a POS terminal at merchant, webpage or popup on a web browser, an alert sent to a phone, etc. In some embodiments, at step S408 a request may actually be sent to the user requesting that he provide additional currency to complete the transaction, such as a request to use non-specific currency associated with the restricted use currency account. In some embodiments, at step S409, the user may authorize the use of non-specific currency for the remainder of the transaction amount. In some embodiments, the user may present a second form of payment for the remaining amount, such as by supplying cash or another payment account.

At step S411, the account balances related to the merchant specific currency and the non-specific currency may be updated to reflect the use in the transaction. This may comprise updating a database, such as the Restricted Use Currency Database 210. In some embodiments, the payment account itself (e.g. an account that is directly linked to currency, such as at the issuer) may be updated based on the use of the currency in the transaction. In some embodiments, the user may monitor the balances of each of the account by utilizing, for instance a web browser and interface provided by the system (such as the web interface that will be described in FIG. 6).

At step S412, the user may present the restricted use currency account as payment in a second transaction with a second merchant. This embodiment illustrates an advantage that may be provided by some of the systems and methods of implementing a restricted use currency account. That is, a single account may be used to provide merchant specific currency for more than one merchant (and also non-specific currency) which reduces the need of carrying or issuing multiple merchant specific currency accounts.

Steps S413-S418 provide that the same steps performed with regards to the first transaction with the first merchant (steps S406-S411) may also be performed for a second transaction with a second transaction. Notably, the merchant specific currency associated with the first merchant cannot be used to pay for all or a portion of the second transaction with the second merchant.

At step S413, the merchant specific currency for the second merchant is applied to at least a portion of the second transaction amount. That is, if there is sufficient merchant specific currency to pay for the transaction amount, then the entire amount of the transaction may be paid for using the merchant specific currency (in that case, the exemplary process may move to step S418). An exemplary process for determining whether there is a sufficient amount of merchant specific currency to pay for a transaction was detailed above with respect to step S312. It should be understood, that any suitable method for determining whether there is sufficient merchant specific currency may be used. Moreover, the process of automatically applying merchant specific currency was discussed in detail with respect to step S314. In some embodiments, if the amount of merchant specific currency associated with the second merchant is insufficient to cover the first transaction amount, then the merchant specific currency that is available may still be applied to pay for at least a portion of the second transaction amount.

As was discussed above, in some embodiments, a restricted use currency account may have user preferences associated with particular aspects including whether to automatically apply non-specific currency if the merchant specific currency is insufficient to pay for a transaction amount. In some embodiments, the non-specific currency is automatically applied. As illustrated in FIG. 4(b), if the restricted use currency account is configured to automatically apply non-specific currency to any remainder of a transaction amount, then the exemplary process proceeds to step S417. In some embodiments, this may comprise sending an authorization request to the issuer of an account for the remainder of the transaction amount. In some embodiments, the non-specific currency may be applied in same manner as the merchant specific currency account; that is by use of a database that maintains the balances along with the settlement process typical in a payment processing network 150.

In some embodiments, the restricted use currency account is not configured to automatically apply non-specific currency to a remainder of a transaction amount. This is illustrated in the exemplary method shown in FIG. 4(b) steps S414-S416. in some embodiments, non-specific currency may be configured to apply non-specific currency automatically to some transactions (e.g. transactions with a first merchant but not a second merchant). In some embodiments, when non-specific currency may be required to complete a transaction, the user may receive a notification at step S414 of the remaining balance after any merchant specific currency has been applied to the transaction amount. The notice may be in any suitable form, including an authorization request message at a POS terminal at merchant, webpage or popup on a web browser, etc. In some embodiments, at step S415 a request may actually be sent to the user requesting that he provide additional currency to complete the transaction, such as a request to use non-specific currency associated with the restricted use currency account. In some embodiments, at step S416, the user may authorize the use of non-specific currency for the remainder of the transaction amount. In some embodiments, the user may present a second form of payment for the remaining amount, such as by supplying cash or another payment account.

At step S418, the account balances related to the merchant specific currency and the non-specific currency may be updated to reflect the use in the transaction. This may comprise updating a database, such as the Restricted Use Database 210. In some embodiments, the payment account itself (e.g. an account that is directly linked to currency, such as at the issuer) may updated based on the use of the currency in the transaction. In some embodiments, the user may monitor the balances of each of the account by utilizing, for instance a web browser and interface provided by the system (such as the web interface that will be described in FIG. 6).

C. Exemplary Method of Merchant Registration

With reference to FIG. 5, an exemplary method of a merchant registration (e.g. merchant's actions in establishing or providing for merchant specific currency). FIG. 5 illustrates two different exemplary ways in which the process may be initiated at steps S501 and S502. However, there may be additional ways in which a merchant may associate merchant specific currency with a restricted use currency account. For instance, although not illustrated, the merchant may provide merchant specific currency as a promotion or reward for purchasing goods and services from the merchant.

At step S501, a merchant may receive a request from a consumer to add an amount of merchant specific currency to a restricted use currency account. In some embodiments, this may comprise a consumer purchasing a "gift card" (e.g. a pre paid account) that may be used at the merchant. As used herein, "gift card" references a payment account whereby the consumer has provided in advance to the merchant value (e.g. money) and in return the merchant has provided an account that may be used at the merchant to purchase goods and/or services. Thus, a gift card may refer to any type of payment account, and may include payment device, which, as defined above, may include a virtual account. In some embodiments, a consumer may use an account number provides by a merchant to add merchant specific to an existing payment account. That is, the user may link the restricted use currency account (e.g. the "gift card" account) to a payment account (such as a credit card account), which relationship may be stored, for example, in Restricted Use Currency Database 210 such that if the payment account is used in a transaction, the system may determine if the merchant specific currency may be applied to the transaction amount. In some embodiments, the user may link a payment account to the "gift card" account, which may become the restricted use currency account. That is, the consumer may associate a payment with the merchant issued account. The payment account may comprise the non-specific currency that may be used to complete transactions for which there is an insufficient amount of merchant specific currency.

In some embodiments, the request from the consumer may comprise a request that is received from web server database interface 190. That is, a consumer may provide merchant specific currency by way of, for example purchasing the merchant specific currency through the web server database 190. The web server database interface 190 may facilitate the transfer of funds from the consumer to the merchant in exchange for the merchant providing merchant specific funds that may be used in a transaction.

With reference to step S502, rather than receiving a request from a consumer to add merchant specific currency, the merchant may establish a relationship with an issuer of an account to provide merchant specific currency. That is, for instance, a merchant may agree that as part of a cross promotional campaign with an issuer, the merchant will provide a certain amount of merchant specific currency for a payment account that is issued. This relationship may provide benefits for both parties. For instance, the issuer may receive the benefit that consumers (e.g. user) may be more inclined to open a payment account because the user will receive the free merchant specific currency. The merchant may receive a benefit because the user will be more likely to conduct a transaction with the merchant so as to take advantage of the free merchant specific currency. This may lead to future business from the user. Moreover, the consumer, while conducting the transaction with the merchant having the intent of using the merchant specific currency, may actually purchase goods in excess of the merchant specific currency associated with the account. The merchant thereby could make a profit, particularly if the account is configured to automatically apply non-specific currency to complete the transaction, such as by using the payment account. This may also benefit the issuer because the issuer receive revenue based on the use of the payment account in a transaction with the merchant.

At step S503, the merchant may request that the merchant specific currency be added to an account. That is, for instance, after the merchant receives payment by the consumer, the merchant may then send a request (which may utilize web server database interface 190, or may directly interface with the server computer 154 or payment processing database 152). The request may comprise a merchant identifier, an account identifier, and the amount of merchant specific currency that is to be added to the account. This information may be stored, for instance in a database such as the Restricted Use Currency Database 210, whereby during a transaction, the information may be quickly accessed.

As mentioned above, in some embodiments, the merchant specific currency information and/or restricted use currency account information may be stored locally at the merchant, which is illustrated at step S504. That is, rather than an embodiment whereby the restricted use currency information is stored at a location such as payment processing network 150, this information may be stored at computer apparatus and/or database located at the merchant. For instance, the merchant may use its own intranet to conduct transactions utilizing the merchant specific currency. In some embodiments, the user may add non-specific currency to the account, and may also associate a payment account (e.g. credit card account) with the restricted use currency account. In some embodiments, the merchant may utilize the payment account as the restricted use currency account, and may thereby associate merchant specific currency with the payment account such that when the payment account is presented to the merchant as payment for a transaction, any merchant specific currency information that is associated with that payment account may be applied to the transaction. As noted above, the same principles described with reference to the use of computer apparatus and/or databases located at the payment processing network 150 apply regarding the operation of such a system located at the merchant, or any other location in system 100.

At step S505, the merchant receives from the consumer the restricted use currency account in a transaction with the merchant. The merchant may then conduct the transaction, and may utilize the merchant specific currency information and/or restricted use currency account information, which was describe with reference to FIGS. 3 and 4.

D. Consumer Registration

With reference to FIG. 6, an exemplary embodiment of a web based interface is shown. It should be understood that FIG. 6 is exemplary of the type of interface that may be provided, and that additional features, or less than these features may be included.

In some embodiments, the interface shown in FIG. 6 may be generated by the server computer 154, and in particular the Restricted Use Currency Registration Module 207. The interface may comprise a part of Web server database interface 190, and may be accessed by a consumer through the internet. The interface may provide the capability to a consumer to establish a restricted use currency account, request that a restricted use currency account be established, provide merchant specific funding and/or non-specific funding to an existing restricted use currency account, establish preferences, and/or perform any other functionality related to the restricted use currency account. The interface may also interact with any of the entities shown in FIG. 1, including the issuer 160 and the merchant 130.

With reference to FIG. 6(*a*) an exemplary interface is shown. FIG. 6(*a*) may correspond to a merchant specific currency addition web page. The interface 600 shown may comprise a webpage, having any suitable URL 601. Account number 602 may correspond the unique identifier for the restricted use currency account, and may be used by the consumer to identify and interact with a specific account.

The portion 603 of the interface provides the ability for the consumer to manage the merchant specific currency associated with the restricted use currency account. A list of participating merchants 604 is provided, which may include some or all of the merchants for which merchant specific currency may be added for the account. The column 605 indicates the current balance of merchant specific currency that is available for use with each of the participating merchants. For instance, the account currently has $5.00 associated with Merchant 2, which could therefore be used if the restricted use currency account was used in a transaction with Merchant 2. The column 606 shows the amount of merchant specific currency that is to be added for each of the participating merchants. The consumer may enter in values for each entry corresponding to each merchant. For instance, in this example, a consumer has chosen to add $10.00 for Merchant 1 (608) and $10.00 for Merchant 2 (610). The column 607 indicates the total amount of merchant specific currency that will be available after the "current balance" in column 605 is added to the "amount to add" in column 606. This represents that amount of merchant specific currency that will be available in a transaction with each of the participating merchants. In this example, Merchant 1 will have a total of $10.00 available (611), while Merchant 2 will have a total of $15.00 available (612).

The portion 613 of the interface 600 provides the user the ability to add non-specific currency to the restricted use currency account. The non-specific currency, as described above, may be used with any merchant and may be automatically applied to complete a transaction with a merchant when the amount of merchant specific currency is insufficient. As shown, the current balance 614 of non-specific currency is $100.00; the consumer has chosen to add $10.00 to the account (615); which results in a total amount available of $110.00 (616). The option provided at 617 is an example of a preference that the consumer (which may be the user) can set with regards to the restricted use currency account. In particular, 617 enables the consumer to specify whether the non-specific use currency may be applied when the merchant specific currency is insufficient to complete a transaction. As indicated in FIG. 6(*a*), the consumer as selected YES (618).

The last portion 619 of the interface 600 shown in FIG. 6(*a*) is to facilitate payment by the consumer to complete the addition of funds to the restricted use currency account. The user may select the payment method 620 and may be prompted to enter in relevant information to complete the transaction 621. After all information is entered, a request may be sent to the merchant to approve the additional merchant specific funds to be added to the account. In some embodiments, the request to add funds may be sent directly to the Restricted Use Currency Database 210. In some embodiments, after the transaction is complete the consumer may receive payment device (such as a card) that is associated with the restricted use currency account, which may, for example be given as a gift in place of a traditional gift card.

With reference to FIG. 6(*b*) a second interface 630 is shown. This exemplary interface 630 may be designed to permit the consumer to associate a payment account with the restricted use currency account. The payment account may comprise the non-specific currency for the restricted use currency account. At 633 the participating merchants for which merchant specific currency may be added are listed, along with current merchant specific currency balances 632. An option to add funds is provided 634, which if selected, for example may take the consumer to interface 600 shown in FIG. 6(*a*). At 635, the consumer is provided with the option as to whether he wishes to link a payment account to the restricted use currency account. If the consumer wishes to do so, at 637 he is prompted to enter information related to the payment account that will be linked to the restricted use currency account. At 636, the user may specify whether the payment account should be automatically applied to pay for any remaining balances for which merchant specific currency is insufficient. At 638, another preference or rule is shown, in which the consumer may set the maximum amount of funds that may be used from the payment account to complete a transaction for which merchant specific currency is insufficient. As shown, the maximum amount is set to $100.00 (639). This may be particularly valuable if the restricted use currency account is to be given as a gift to a different user.

Embodiments as described herein of systems and methods for utilizing merchant specific currency to conduct transactions may provide some or all of the following advantages: Embodiments may permit merchant specific currency for a plurality of merchants to be associated with a single restricted use currency account. This may provide the advantage that a user need not, for example, carry multiple payment devices when conducting transactions with merchants for which the user has merchant specific currency, because a single payment device may be associated with, and capable of utilizing, the merchant specific currency for each merchant.

Embodiments may also provide an advantage over the tradition practice of using "gift cards" or accounts for specific merchants as gifts (i.e. presents) or awards for use by other individuals. To provide a user with merchant specific currency using traditional gift cards for multiple merchants, a consumer would have to purchase multiple gift cards, and may have to do so from each merchant individually. While gift cards such as VISA pre paid cards provide for greater flexibility and convenience in that these payment devices may be used at a variety of merchants, they do not provide the specificity and the therefore the benefit of encouraging a particular use of that currency that a traditional gift card provides. For instance, a consumer may provide a user with a gift card to a toy store to promote the user to use the money provided thereon to purchase a gift for a child. Embodiments provided herein may provide dome or all of the advantages of both of these systems, without some or all of the disadvantages. For instance, a consumer wishing to provide encouragement to for a user to use the currency for a specific purpose may designate a particular merchant (or group of merchants) that the merchant specific currency may be used for (e.g. this currency may be used at a toy store). Moreover, if the person wishes to provide encouragement for two separate uses, embodiments may allow the consumer to provide a single account (and/or payment device) that comprises merchant specific currency for two different merchants (e.g. $50 for merchant A and $50 for merchant B). Moreover, to provide some flexibility in the spending, embodiments may permit the consumer to provide non-specific currency and associate it with the restricted use currency account (e.g. $50 of non-specific currency). In this way, embodiments may provide the consumer with the ability to provide encouragement for specific uses, without having to conduct transactions with multiple merchants or provide multiple different restricted use currency accounts and/or payment devices, and still provide some flexibility in how the total funds are spent.

Embodiments may also provide the convenience of not having to use a payment device associated with a merchant specific currency account (e.g. restricted use currency account) and a separate payment device associated with a non-specific currency payment account to conduct a single transaction that exceeds the amount of merchant specific currency available. Presently, a user may be required to essentially conduct two separate transactions—the first using the merchant specific currency (up to the remaining balance), and then the user has to locate and provide to the merchant a second non-specific currency payment account for any remaining balance. This is an inefficient use of time and is not convenient. Embodiments may provide for the automatic use of non-specific currency when merchant specific currency is insufficient to complete the transaction, thereby saving time and effort for the user. Similarly, embodiments may alleviate the need for individuals to track the amount of remaining balance on a merchant specific currency account out of concern that the amount may be insufficient for a transaction amount and the transaction may thereby be declined.

Also, as described above, embodiments may provide an opportunity to increase demand for payment accounts by utilizing merchant specific currency associated with the issued payment account. Moreover, by directly linking the promotion to the payment account, this may increase the convenience to the user, thereby further increasing the likelihood of consumer participation in the promotional program because the user need not keep track of separate coupons or gift cards. Embodiments may also create benefits for a merchant for associating the merchant specific currency with an issued payment account (e.g. a credit card account), in that it may promote business with the user, and the user may be willing to conduct a transaction that exceeds the merchant specific currency amount.

Embodiments may provide the advantage that a computer apparatus may approve a and or conduct a transaction comprising both merchant specific currency and non-specific currency, without the need to send an authorization request to an issuer of account because, for instance, the relevant account balances may be stored in a database. Embodiments may also provide the advantage that only a single authorization request message be sent to apply two different types of currency for the same transaction because, for instance, the merchant specific currency amount may be monitored at a database, even though the non-specific currency may be associated with payment account that requires an authorization request. Even current systems, that do not use different types of currency but may use different types of value are to be applied to conduct a single transaction (e.g. a rewards account and a payment account) require two separate authorization messages to be generated. This is inefficient and may create undue load on the system.

Figure 7:
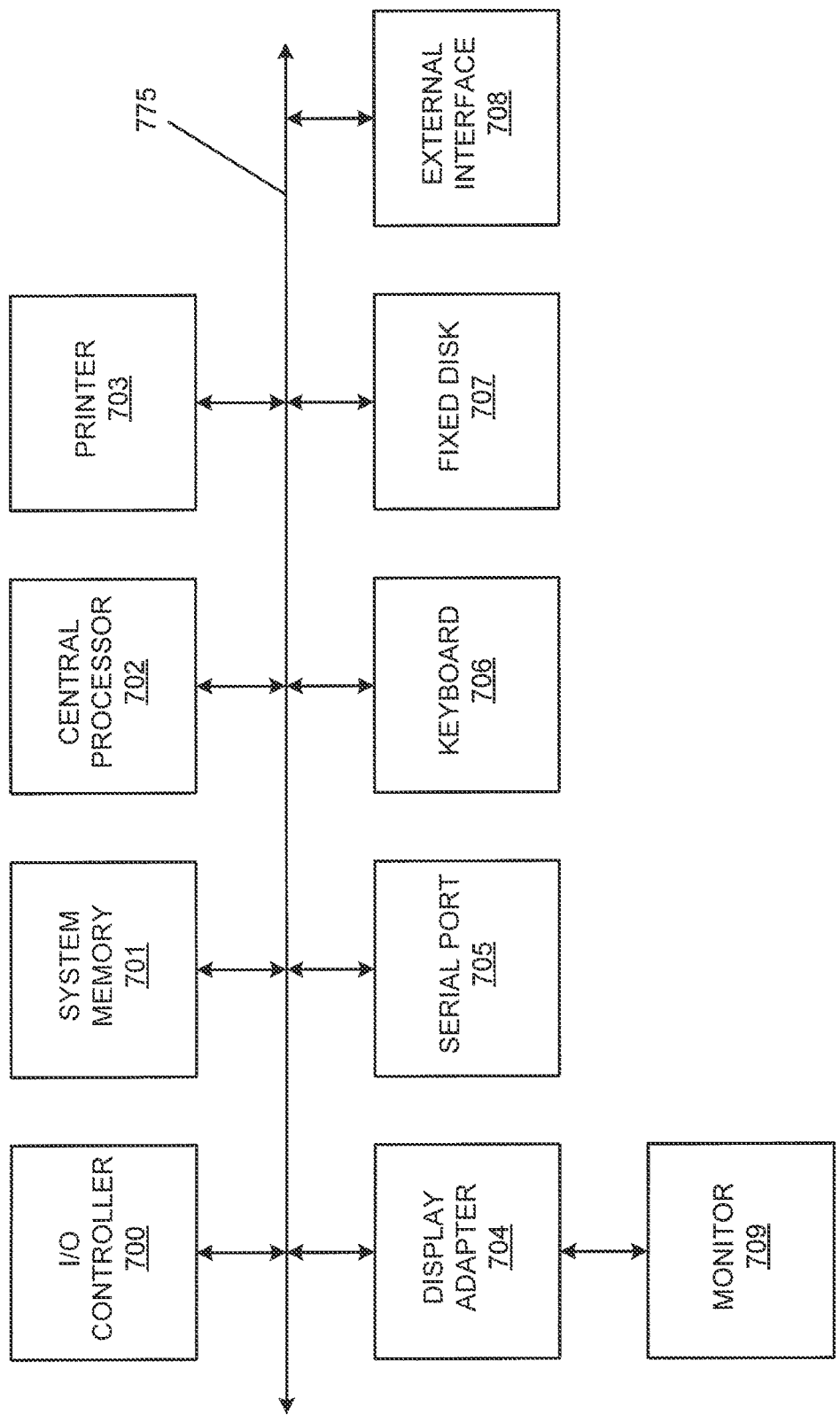
FIG. 7 shows a block diagram of components of an exemplary computer apparatus.

Referring now to FIG. 7 the various participants and elements (e.g., the issuer 160, the payment processing network 150, the server computer 154, the merchant 130, the acquirer 140, and the merchant computer apparatus 136) in FIGS. 1 and 2 can operate one or more computer apparatuses (e.g., a server computer) to facilitate the functions described herein. Any of the elements in FIGS. 1 and 2 can use any suitable number of subsystems to facilitate the functions described herein. Examples of such subsystems or components are shown in FIG. 7. The subsystems shown in FIG. 7 are interconnected via a system bus 775. Additional subsystems such as a printer 703, keyboard 706, fixed disk 707 (or other memory comprising computer readable media), monitor 709, which is coupled to display adapter 704, and others are shown. Peripherals and input/output (I/O) devices, which coupled to I/O controller 700, can be connected to the computer system by any number of means known in the art, such as serial port 705. For example, serial port 705 or external interface 708 can be used to connect the computer apparatus to a wide area network such as the Internet, a mouse input device, or a scanner. The interconnection via system bus allows the central processor 702 to communicate with each subsystem and to control the execution of instructions from system memory 701 or the fixed disk 707, as well as the exchange of information between subsystems. The system memory 701 and/or the fixed disk 707 can embody a computer readable medium.

Figure 8A:
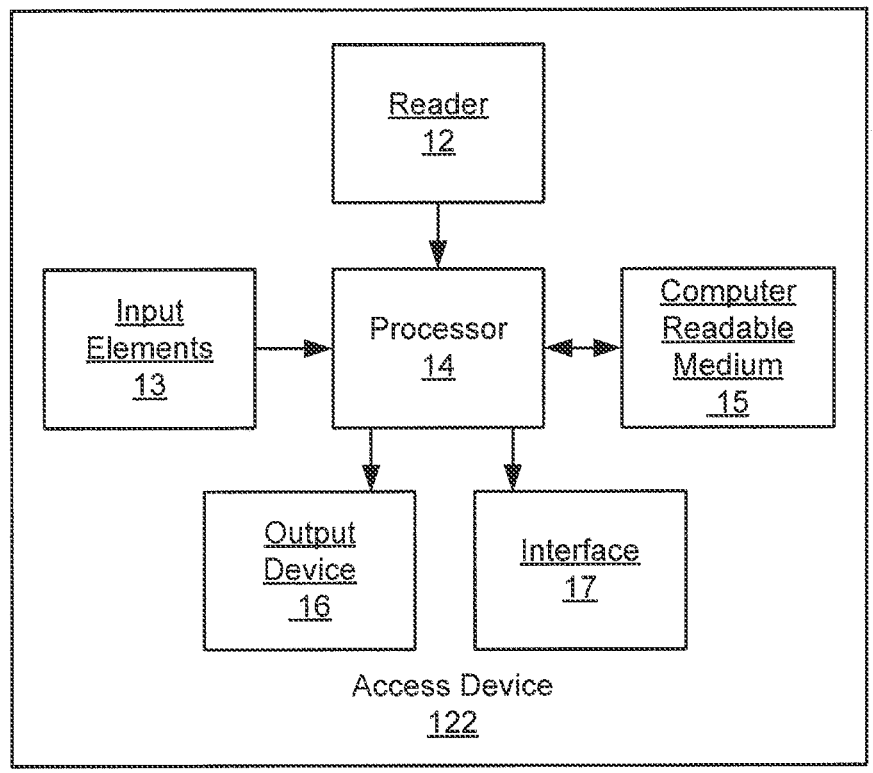
FIG. 8 shows a block diagram of an access device and an exemplary payment device.

Referring now to FIG. 8(*a*), a block diagram of access device 122, which can be a scanner, is illustrated according to an embodiment of the invention. Access device can be utilized interchangeably with access device or terminal, point of sale (POS) device or terminal, and/or reader and terminal within the present disclosure. The access device 122 comprises a processor 14 operatively coupled to a computer readable medium 15 (e.g., one or more memory chips, etc.), input elements 13 such as buttons or the like, one or more readers 12 (e.g., a barcode reader, optical scanner, etc.), an output device 16 (e.g., a display, a speaker, etc.) and an interface 17. A housing can contain one or more of these components. The computer readable medium 15 can comprise instructions or code, executable by a processor. The interface 17 can be a wired or wireless interface capable of communication with the merchant register. In another embodiment, interface 17 can be a network interface for direct communication with acquirer 140, payment processing network 150, server computer 154, merchant computer apparatus 134, or any other device.

Figure 8B:
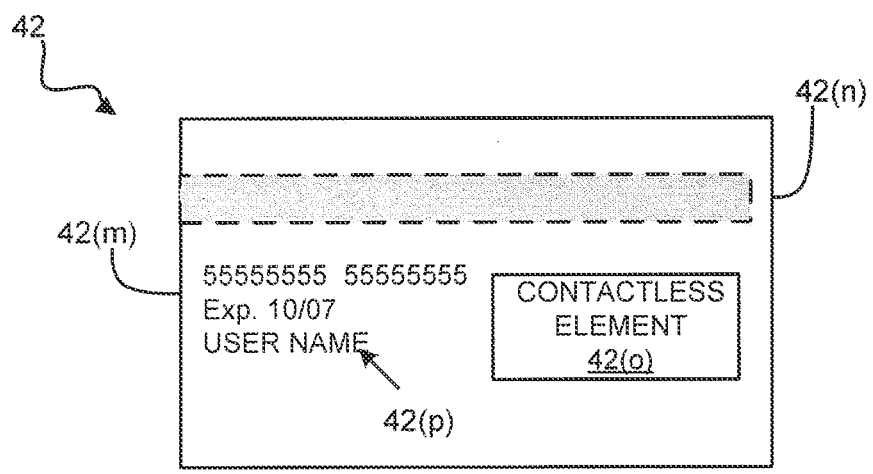

With reference to FIG. 8(b), an example of a payment device in the form of a card 42 is shown. FIG. 8(b) shows a plastic substrate 42(m). A contactless element 42(o) for interfacing with an access device such as a point of sale terminal may be present on or embedded within the plastic substrate 42(m). Consumer information 42(p) such as an account number, expiration date, and consumer name may be printed or embossed on the card. Also, a magnetic stripe 42(n) may be on the plastic substrate 42(m).

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, can be implemented as software code to be executed by a processor using any suitable computer language such as, for example, Java, C++ or Perl using, for example, conventional or object-oriented techniques. The software code can be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium can reside on or within a single computational apparatus, and can be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment can be combined with one or more features of any other embodiment without departing from the scope of the invention.

A recitation of "a", "an" or "the" is intended to mean "one or more" unless specifically indicated to the contrary

What is claimed is:

1. A method comprising:
    receiving at a computer apparatus of an issuer an authorization request message comprising a first merchant identifier, an account identifier associated with an account, and a first transaction amount for a first transaction conducted with a first merchant;
    determining, by the computer apparatus, if the account comprises merchant specific currency associated with the first merchant that may be used to conduct the first transaction; and
    determining if there is sufficient merchant specific currency associated with the first merchant in the account to pay for the first transaction amount;
    wherein if there is not sufficient merchant specific currency associated with the first merchant to pay for the first transaction amount, then automatically applying non-specific currency in the account to a remainder of the first transaction amount;
    wherein the computer apparatus of the issuer associates the merchant specific currency with the account, and the authorization request message is sent through a payment processing network that has no knowledge of the merchant specific currency during processing of the transaction.

2. The method of claim 1, further comprising:
    automatically applying merchant specific currency associated with the first merchant to pay for at least a portion of the first transaction amount.

3. The method of claim 1, wherein automatically applying non-specific currency comprises sending an authorization request message to an issuer of the account for the remainder of the first transaction amount.

4. The method of claim 1, wherein if there is insufficient merchant specific currency associated with the first merchant to pay for the first transaction amount, the method further comprises determining if there is sufficient non-specific currency in the account to pay for the remainder of the first transaction amount.

5. The method of claim 1, wherein if there is insufficient non-specific currency in the account to pay for the remainder of the first transaction, then sending an authorization response message to the first merchant denying the first transaction.

6. The method of claim 1, wherein the account identifier is a merchant account identifier.

7. The method of claim 1, wherein the account identifier is an issuer account identifier.

8. The method of claim 1, wherein the account is a payment account.

9. The method of claim 8, wherein the payment account includes any one of: a credit card account; a debit account; a bank account; and a pre-paid account.

10. The method of claim 8, further comprising receiving an indication that the payment account is to be automatically applied as payment for a remainder of a transaction if the merchant specific currency is insufficient.

11. The method of claim 1, further comprising:
    receiving a first request at the computer apparatus to add a first amount of merchant specific currency associated with the first merchant to the account; and
    adding the first amount of merchant specific currency to the account.

12. The method of claim 11, wherein the first request originates from any one of: the first merchant; an issuer of the account; and a user, wherein the user is not involved in the first transaction.

13. The method of claim 11, further comprising:
    receiving a second request at the computer apparatus to add a second amount of merchant specific currency associated with a second merchant to the account; and
    adding the second amount of merchant specific currency to the account;
    wherein the second request originates from any one of:
        the second merchant;
        an issuer of the account; and
        a user, wherein the user is not involved with the first transaction.

14. The method of claim 11, further comprising:
receiving a third request at the computer apparatus to add a first amount of non-specific currency to the account; and
adding the first amount of non-specific currency to the account;
wherein the third request originates from any one of: the first merchant; an issuer of the account; and a user, wherein the user is not associated with the first transaction.

15. The method of claim 14, wherein the first request, the second request, and the third request comprise the same request.

16. The method of claim 11, wherein the first request is based at least in part on the initiation of a payment account.

17. The method of claim 1, further comprising:
receiving at a computer apparatus an authorization request message comprising a second merchant identifier, the account identifier associated with an account, and a second transaction amount for a second transaction conducted with a second merchant;
determining, by the computer apparatus, if the account comprises merchant specific currency associated with the second merchant that may be used to conduct the second transaction; and
determining if there is sufficient merchant specific currency associated with the second merchant in the account to pay for the second transaction amount;
wherein if there is not sufficient merchant specific currency associated with the second merchant to pay for the second transaction amount, then automatically applying non-specific currency in the account to a remainder of the second transaction amount.

18. A computer apparatus comprising:
a processor; and
a computer-readable medium coupled to the processor, the computer readable medium comprising code executable by the processor for implementing a method comprising:
receiving at a computer apparatus of the issuer an authorization request message comprising a first merchant identifier, an account identifier associated with an account, and a first transaction amount for a first transaction conducted with a first merchant;
determining, by the computer apparatus, if the account comprises merchant specific currency associated with the first merchant that may be used to conduct the first transaction; and determining if there is sufficient merchant specific currency associated with the first merchant in the account to pay for the first transaction amount;
wherein if there is not sufficient merchant specific currency associated with the first merchant to pay for the first transaction amount, then automatically applying non-specific currency in the account to a remainder of the first transaction amount;
wherein the computer apparatus of the issuer associates the merchant specific currency with the account, and the authorization request message is sent through a payment processing network that has no knowledge of the merchant specific currency during processing of the transaction.

19. The method of claim 18, wherein automatically applying non-specific currency comprises sending an authorization request message to an issuer of the account for the remainder of the first transaction amount.

20. A non-transitory computer readable storage medium comprising code stored thereon executable by a processor, for implementing a method comprising:
receiving at a computer apparatus of an issuer an authorization request message comprising a first merchant identifier, an account identifier associated with an account, and a first transaction amount for a first transaction conducted with a first merchant;
determining, by the computer apparatus, if the account comprises merchant specific currency associated with the first merchant that may be used to conduct the first transaction; and determining if there is sufficient merchant specific currency associated with the first merchant in the account to pay for the first transaction amount;
wherein if there is not sufficient merchant specific currency associated with the first merchant to pay for the first transaction amount, then automatically applying non-specific currency in the account to a remainder of the first transaction amount;
wherein the computer apparatus of the issuer associates the merchant specific currency with the account, and the authorization request message is sent through a payment processing network that has no knowledge of the merchant specific currency during processing of the transaction.

21. The method of claim 1 wherein the merchant specific currency is associated with multiple merchants.

22. The method of claim 3 wherein the authorization request message is not sent to the issuer of the account when the first transaction amount is fully covered by the merchant specific currency.

23. A method comprising:
receiving at a computer apparatus of an issuer an authorization request message comprising a first merchant identifier, an account identifier associated with an account, and a first transaction amount for a first transaction conducted with a first merchant;
determining, by the computer apparatus, if the account comprises merchant specific currency associated with the first merchant that may be used to conduct the first transaction; and
determining if there is sufficient merchant specific currency associated with the first merchant in the account to pay for the first transaction amount,
wherein if there is not sufficient merchant specific currency associated with the first merchant to pay for the first transaction amount, then automatically applying non-specific currency in the account to a remainder of the first transaction amount,
wherein automatically applying non-specific currency comprises sending an authorization request message to an issuer of the account for the remainder of the first transaction amount, and
wherein the computer apparatus of the issuer associates the merchant specific currency with the account, and the authorization request message is sent through a payment processing network that has no knowledge of the merchant specific currency during processing of the transaction.

24. The method of claim 23 wherein the merchant specific currency is applied when the transaction reaches the issuer instead of at the computer apparatus in the payment processing network.

25. The method of claim 24 wherein user preference information is used to determine whether to automatically apply the non-specific currency to complete transactions when there is insufficient merchant specific currency.

* * * * *